United States Patent [19]
Yamashita et al.

[11] Patent Number: 5,726,869
[45] Date of Patent: Mar. 10, 1998

[54] SYNCHRONOUS RECTIFIER TYPE DC-TO-DC CONVERTER IN WHICH A SATURABLE INDUCTIVE DEVICE IS CONNECTED IN SERIES WITH A SECONDARY-SIDE SWITCHING DEVICE

[75] Inventors: Shigeharu Yamashita; Kazutoshi Fuchigami; Tetsuya Yamamoto; Shinichi Otsu; Hiroshi Shimamori; Sentarou Tokimi, all of Kawasaki, Japan

[73] Assignees: Fujitsu Limited; Fujitsu Denso Limited, both of Kawasaki, Japan

[21] Appl. No.: 724,955

[22] Filed: Oct. 2, 1996

[30] Foreign Application Priority Data

Oct. 5, 1995 [JP] Japan .................... 7-258503

[51] Int. Cl.$^6$ .................... H02M 3/335
[52] U.S. Cl. .................... 363/21; 363/97
[58] Field of Search .................... 363/16, 20, 21, 363/97, 131

[56] References Cited

U.S. PATENT DOCUMENTS

| | | | |
|---|---|---|---|
| 3,697,851 | 10/1972 | Mast | 363/19 |
| 4,021,720 | 5/1977 | Linnman | 363/24 |
| 4,441,146 | 4/1984 | Vinciarelli | 363/20 |
| 4,977,493 | 12/1990 | Smith | 363/126 |
| 5,434,768 | 7/1995 | Jitaru et al. | 363/21 |

*Primary Examiner*—Matthew V. Nguyen
*Attorney, Agent, or Firm*—Staas & Halsey

[57] ABSTRACT

Disclosed is a synchronous rectifier type DC-to-DC converter capable of preventing an increase in losses occurring when a rectifier synchronous rectification switch and a flywheel synchronous rectification switch, which are responsible for rectification on the side of a secondary winding of a transformer, are turned on simultaneously, and the destruction of FETs or windings due to large currents. The DC-to-DC converter comprises a transformer, a primary switching device connected in series with a primary winding of the transformer, a control circuit for controlling turning on or off of the primary switching device, a rectifier synchronous rectification switching device, and a flywheel synchronous rectification switching device, and converts a voltage of a DC power source into another voltage. The DC-to-DC converter further comprises a rectifier rise delay inductive device connected in series with the rectifier synchronous rectification switching device and a flywheel rise delay inductive device connected in series with the flywheel synchronous rectification switching device.

13 Claims, 20 Drawing Sheets

5,726,869

SYNCHRONOUS RECTIFIER TYPE DC-TO-DC CONVERTER IN WHICH A SATURABLE INDUCTIVE DEVICE IS CONNECTED IN SERIES WITH A SECONDARY-SIDE SWITCHING DEVICE

BACKGROUND OF THE INVENTION

1. Field of the Invention

The present invention relates to a DC-to-DC converter for converting a DC voltage into another DC voltage. More particularly, this invention is concerned with a DC-to-DC converter having a synchronous rectification circuit in which a synchronous rectification switch, formed by a field effect transistor or the like, is used to perform rectification on the side of a secondary winding.

2. Description of the Related Art

DC-to-DC converters for converting a voltage of a DC power source into another DC voltage have been widely adopted. A known DC-to-DC converter comprises a transformer having a primary winding thereof connected to a DC power source, a field effect transistor (hereinafter referred to as an FET) being connected in series with the primary winding and operating as a primary switch for turning on or off a current flowing from the DC power source to the primary winding, a rectifier diode interposed between a secondary winding and output terminals, a flywheel diode connected in parallel with the secondary winding, a smoothing choke coil, and a smoothing capacitor. In this kind of DC-to-DC converter, diodes are used as rectifying elements on the secondary side of the transformer. The forward voltage applicable to each diode is about 0.6 V. This poses the problem of a loss stemming from a on-state resistance. A DC-to-DC converter, in which switches formed with FETs or the like, whose resistances are smaller than the on-state resistance of the diodes are substituted for the diodes on the secondary side of a transformer in order to reduce losses, is attracting attention. Herein, a DC-to-DC converter in which switches are substituted for two diodes on the secondary side of a transformer shall be referred to as a synchronous rectifier type DC-to-DC converter. A switch substituted for a rectifier diode shall be referred to as a rectifier synchronous rectification switch. A switch substituted for a flywheel diode shall be referred to as a flywheel synchronous rectification switch. Moreover, a switch FET substituted for the rectifier diode shall be referred to as a rectifier synchronous rectification switch FET (rectifier FET), and a switch FET substituted for the flywheel diode shall be referred to as a flywheel synchronous rectification switch FET (flywheel FET). Turning on or off the rectifier synchronous rectification switch is controlled so that the state of the switch will be the same as that of the primary switch. Turning on or off the flywheel synchronous rectification switch is controlled so that the state of the switch will be opposite to that of the primary switch.

As mentioned above, turning on or off the rectifier synchronous rectification switch and flywheel synchronous rectification switch is controlled so that the states of the switches will be mutually opposite. It takes time to change an on state into an off state or vice versa or, in other words, the operation is delayed. For this reason, the rectifier FET and flywheel FET forming the rectifier synchronous rectification switch and flywheel synchronous rectification switch are turned on simultaneously, and the secondary winding of the transformer is short-circuited. This causes a large current to flow into the rectifier synchronous rectification switch and flywheel synchronous rectification switch. Besides, a large current flows into the primary switch connected to the primary winding of the transformer. This leads to an increased loss due to an overcurrent. At worst, there arises a problem that the FETs forming these switches or the windings may be destroyed because of the large current.

SUMMARY OF THE INVENTION

An object of the present invention is to provide a synchronous rectifier type DC-to-DC converter using switches for rectification on the side of a secondary winding and being capable of preventing both an increase in loss, occurring when both a rectifier synchronous rectification switch and flywheel synchronous rectification switch are turned on simultaneously, and the destruction of FETs or windings due to a large current.

A DC-to-DC converter for converting a voltage of a DC power source into another voltage in accordance with the present invention comprises: a transformer having a primary winding thereof connected to the DC power source; a primary switching device connected in series with the primary winding; a control circuit for controlling turning on or off of the primary switching device; a flywheel inductive device connected between a secondary winding of the transformer and output terminals of the DC-to-DC converter; a rectifier synchronous rectification switching device connected between the secondary winding of the transformer and the output terminals of the DC-to-DC converter; and a flywheel synchronous rectification switching device connected in parallel with the secondary winding of the transformer and used to define a route leading from one of the output terminals to the other output terminal by way of the flywheel inductive device and flywheel synchronous rectification switching device. For accomplishing the foregoing object, the DC-to-DC converter is provided with a rectifier rise delay inductive device connected in series with the rectifier synchronous rectification switching device, and a flywheel rise delay inductive device connected in series with the flywheel synchronous rectification switching device.

Since it takes time to change states, when the rectifier synchronous rectification switching device or flywheel synchronous rectification switching device are changed from an on state to an off state, the flywheel synchronous rectification switching device is turned on before the rectifier synchronous rectification switching device is fully turned off. This causes a current flowing into the flywheel synchronous rectification switching device to increase. At this time, the flywheel rise delay inductive device delays an increase in the current flowing into the flywheel synchronous rectification switching device. Therefore, even when the states of the rectifier synchronous rectification switching device and flywheel synchronous rectification switching device are changed according to the same timing, a state in which a large current flows into the rectifier synchronous rectification switching device and flywheel synchronous rectification switching device at the same time, that is, a short-circuited state of the secondary winding of the transformer can be avoided. Likewise, when the flywheel synchronous rectification switching device is changed from the on state to the off state and the rectifier synchronous rectification switching device is changed from the off state to the on state, the rectifier rise delay inductive device delays an increase in current flowing into the rectifier synchronous rectification switching device.

Conceivably, when the rectifier synchronous rectification switching device and flywheel synchronous rectification switching device are to be turned on or off, a short period may be assigned as a period during which both the switching devices are off for fear both the switching devices should be turned on simultaneously. However, during the period, a current flows into the parasitic diodes in the FETs forming the rectifier synchronous rectification switching device and the flywheel synchronous rectification switching device. The on-state resistances of the parasitic diodes are larger than those of the diodes employed as rectifying elements on the secondary side of the transformer in the known circuit. This poses a problem of larger losses. For specifying the period during which both the rectifier synchronous rectification switching device and flywheel synchronous rectification switching device are off without turning the switching devices on or off simultaneously, it is necessary to produce another control signal lagging by a given time interval. The circuit then becomes more complex. By contrast, the DC-to-DC converter of the present invention can change the states of the rectifier synchronous rectification switching device and flywheel synchronous rectification switching device according to the same timing, can therefore reduce currents flowing into the parasitic diodes, and can eventually diminish losses.

FETs are used as switching devices such as the rectifier synchronous rectification switching device, flywheel synchronous rectification switching device, and primary switching device.

As the rectifier rise delay inductive device and flywheel rise delay inductive device, for example, coils can be used. However, it is preferred to use saturable inductors that act as inductors at a current equal to or smaller than a given current and that do not act as inductors at a current larger than the given current but are saturated.

Turning on or off the rectifier synchronous rectification switching device and flywheel synchronous rectification switching device may be controlled in the control circuit in the same way that turning on or off the primary switch is. Alternatively, an induced voltage in the secondary winding of the transformer or an induced voltage in a separate tertiary winding may be used to control the turning on or off.

Preferably, the rectifier rise delay inductive device and flywheel rise delay inductive device are located at positions not affecting a change speed at which the states of the rectifier synchronous rectification switching device and flywheel synchronous rectification switching device are changed.

Furthermore, it is preferable to include a snubber circuit in which a series circuit made by connecting an auxiliary switching device and an auxiliary capacitive device in series with each other is connected in parallel with the primary switching device. Turning on or off the auxiliary switching device of the snubber circuit is controlled so that the state of the auxiliary switching device will be opposite to that of the primary switching device. Preferably, control is given so that there will be a period during which both the auxiliary switching device and primary switching device are off.

A terminal voltage of an auxiliary capacitive device may be used as a power supply for the control circuit.

Furthermore, the DC-to-DC converter may be of a double transistor type in which a second primary switching device is connected in series with the other end of the primary winding to one node of which the primary switching device is connected.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Before proceeding to a detailed description of the preferred embodiments of the present invention, a prior art DC-DC converter will be described with reference to the accompanying drawings relating thereto for a clear understanding of the differences between the prior art and the present invention.

Figure 1A:
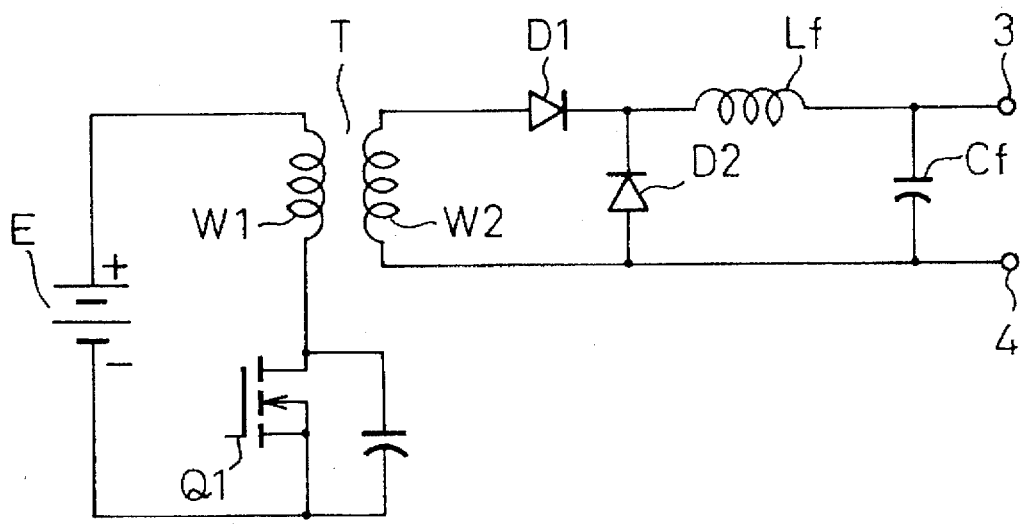
FIG. 1A shows the circuitry of a forward converter of a single ended type of a prior art.
Figure 1B:
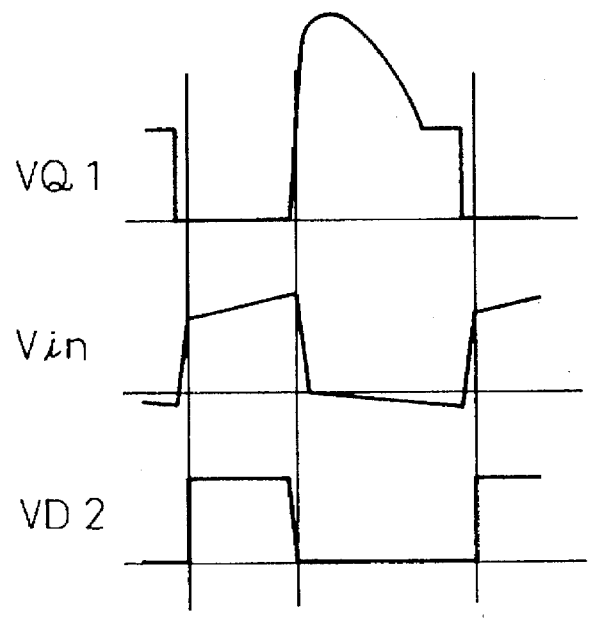
FIG. 1B is a timing chart indicating the operations of the converter shown in FIG. 1A.

FIG. 1A shows the circuitry of a forward converter of a single ended type of a prior art, and FIG. 1B is a timing chart indicating the operations of the converter shown in FIG. 1A. In FIG. 1A, there are shown a battery or DC power source E of a rectified AC voltage, a primary winding W1, a secondary winding W2, an FET Q1 acting as a primary switch, diodes D1 and D2 acting as rectifying elements, a smoothing choke coil Lf, a smoothing capacitor Cf, and output terminals 3 and 4 for outputting a stabilized DC voltage. Reference numeral VQ1 denotes a voltage across the FET Q1, Iin denotes a current flowing into the primary winding, and VD2 denotes a voltage across the diode D2. In the drawings, the components having the same functions will be assigned the same reference numerals. Turning on or off the FET Q1 is controlled at intervals of a given cycle. When the FET Q1 is on, a current flows from the power source E to the primary winding, and a voltage is induced in the secondary winding W2. The voltage is then output to one output terminal through the diode D1 and inductor Lf. When the FET Q1 is on, the voltage VQ1 is zero, the current Iin is positive, and the voltage VD2 is zero. When the FET Q1 is turned off, a voltage is induced in an opposite direction in the primary winding and secondary winding. Since the diode D1 is turned off, the voltage induced in an opposite direction does not affect the output terminal. Since a current flowing through the diode D1 is cut off, a voltage or counter-electromotive force is developed in the inductor Lf. The voltage is output to the output terminal through the diode D2 and inductor Lf. When the FET Q1 is off, the voltage vQ1 is equal to the sum of a source voltage and the voltage or counter-electromotive force developed in the primary winding. The voltage VD2 is zero. The current Iin changes from zero to a negative value. A negative current means that a current returns to the power source E, and is therefore referred to as a circulating current.

Figure 2A:
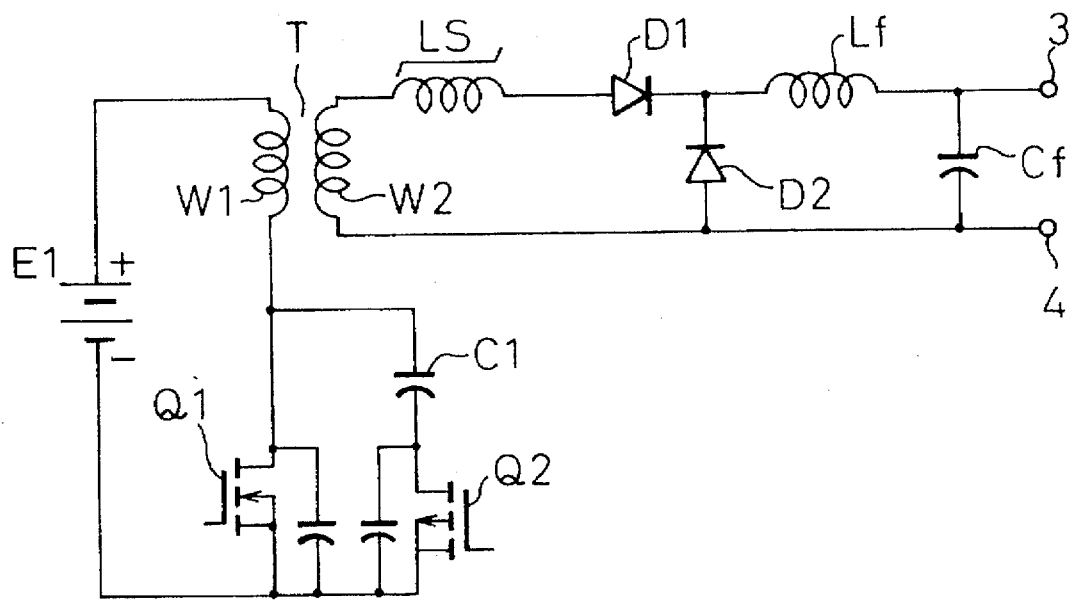
FIG. 2A shows the circuitry of a converter of another prior art.
Figure 2B:
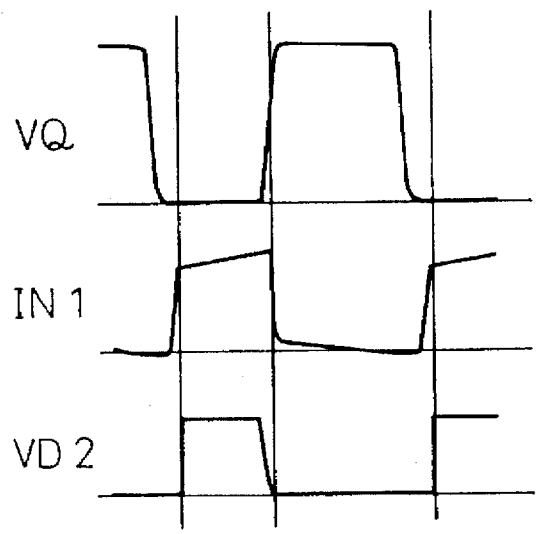
FIG. 2B is a timing chart indicating the operations of the converter shown in FIG. 2A.

FIG. 2A shows the circuitry of a converter of another prior art, and FIG. 2B is a timing chart indicating the operations of the converter shown in FIG. 2A. This circuitry is such that a non-loss snubber circuit made by connecting an FET Q2 acting as an auxiliary switch in series with a snubber capacitor C1 is connected in parallel with the FET Q1 included in the circuit shown in FIG. 1A, and a saturable inductor LS is connected in series with the diode D1. The peak voltage of the FET Q1 is clamped to the voltage in the capacitor C1 by way of the FET Q2, and the output capacitances of the FETs Q1 and Q2 are used to realize zero-volt switching (OVS). The FETs Q1 and Q2 are turned on or off alternately. During changing of the states of the FETs, a short simultaneous-off period during which the output capacitances are charged or discharged is spent in order to cause the parasitic diodes of the FETs to conduct. The parasitic diode is generally called a body diode. Therefore, the parasitic diode is called a body diode in the following. The saturable inductor LS prevents the exciting current flowing into the transformer T being blocked by the diodes D1 and D2 on the secondary side of the transformer until the FET Q1 is turned on through zero-volt switching after the FET Q2 is turned off. The inductor LS acts as a transient switch and a current snubber and is used to suppress parasitic oscillations caused by the capacitances of the diodes and the flow of a reverse recovery current.

Figure 3:
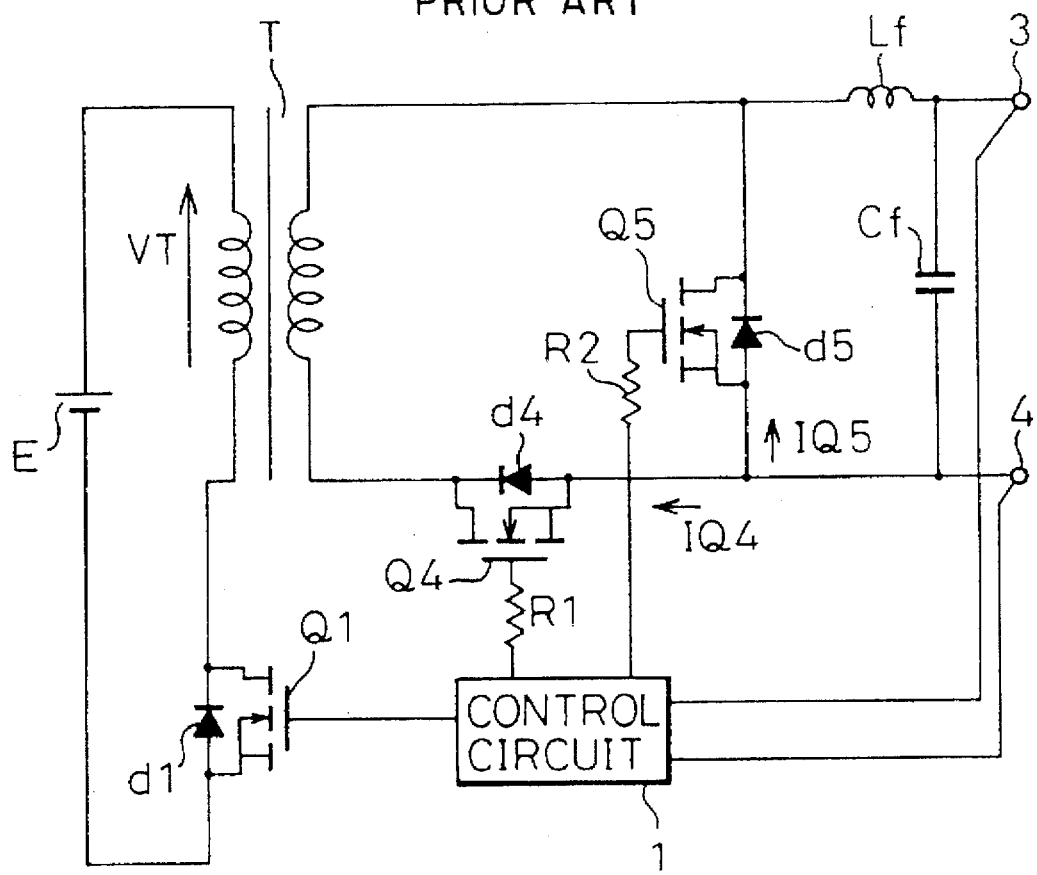
FIG. 3 shows the circuitry of a synchronous rectifier type DC-to-DC converter of a prior art.
Figure 4:
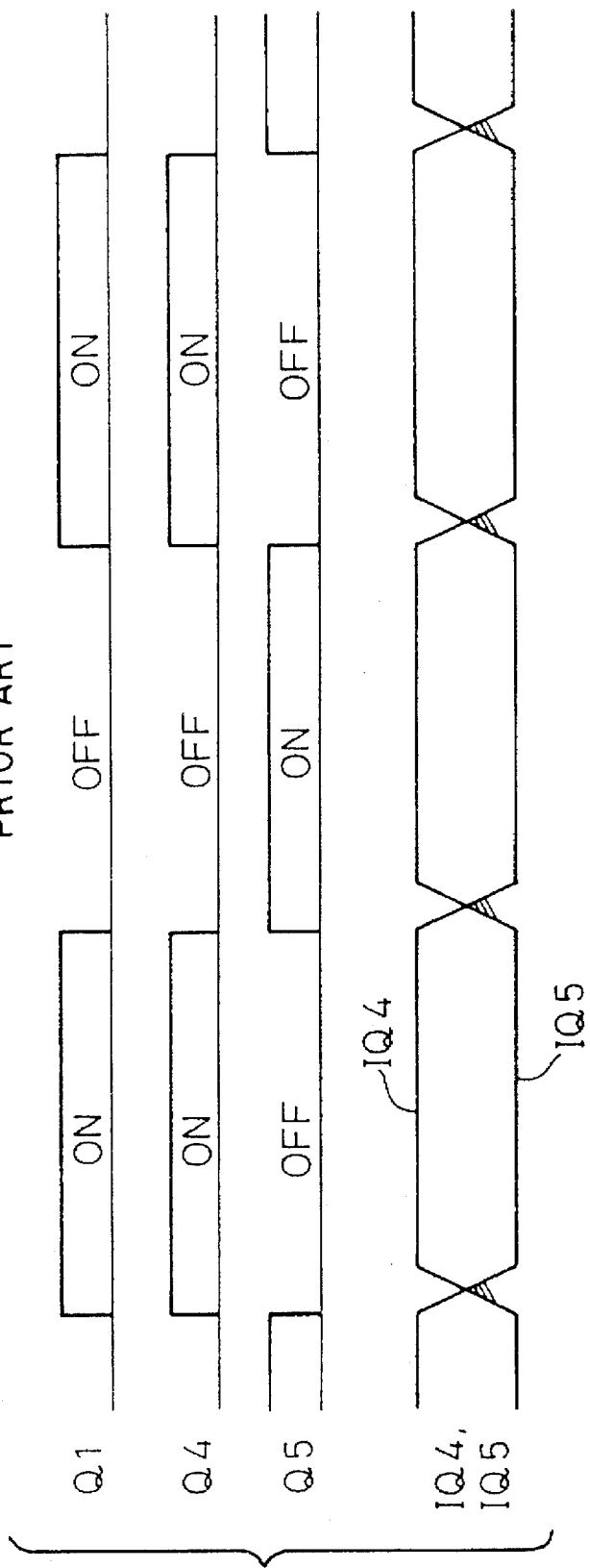
FIG. 4 is a timing chart indicating the operations of the converter shown in FIG. 3.

In the circuits shown in FIGS. 1A and 2A, diodes are used as rectifying elements on the secondary side of a transformer. The forward voltage applicable to a diode is about 0.6 V. This poses the problem of a loss caused by a on-state resistance. FIG. 3 shows the circuitry of a prior art in which switches whose resistances are smaller than the on-state resistance are substituted for the diodes on the secondary side of a transformer in order to reduce losses. FIG. 4 is a timing chart indicating the operations of the circuit shown in FIG. 3. Referring to FIG. 4, the operations of the illustrated circuit will be described.

In the circuit shown in FIG. 3, switches formed by FETs Q4 and Q5 are substituted for the diodes D1 and D2, and a control circuit 1 controls turning on or off of the FETs Q4 and Q5. The FET Q1 is also controlled by the control circuit 1. d1, d4, and d5 denote body diodes (parasitic diodes) each formed at a junction between a p-type region of a substrate of an FET and an n-type region thereof. R1 and R2 denote resistors. The FET Q1 shall be called a rectifier synchronous rectification switch, while the FET Q5 shall be called a flywheel synchronous rectification switch.

The control circuit 1 controls turning on or off of the FET Q1 at intervals of a given cycle in the same manner as that in the circuit shown in FIG. 1. In the circuit shown in FIG. 3, a DC voltage between the output terminals 3 and 4 is compared with a set reference voltage. The on period of the FET Q1 is controlled according to the difference. During the on period of the FET Q1, the FET Q4 serving as a rectifier synchronous rectification switch is turned on, while the FET Q5 serving as a flywheel synchronous rectification switch is turned off. During the off period of the FET Q1, the FET Q4 is turned off, while the FET Q5 is turned on. These operations are identical to those in the circuit shown in FIG. 1.

Turning on or off the FET Q4 and turning on or off the FET Q5 are controlled alternately. It takes time to change an on state into an off state or vice versa, or the operation is delayed. For this reason, the currents IQ4 and IQ5 flowing into the FETs Q4 and Q5 vary as illustrated. When the on state is changed into the off state or vice versa, the FETs Q4 and Q5 are turned on simultaneously. If the FETs Q4 and Q5 are turned on simultaneously, the secondary winding of the transformer T may be short-circuited. This causes a large current to flow into the FETs Q4 and Q5. A large current also flows into the FET Q1 connected to the primary winding of the transformer T. This results in an increase in losses caused by an overcurrent. At worst, there arises a problem that the FETs Q1, Q4, and Q5, and the windings are destroyed because of the large currents.

Conceivably, when the FETs Q4 and Q5 are to be turned on or off, a short period may be assigned as a period during which both the FETs are off for fear both the FETs should be turned on simultaneously. However, during this period, a current flows into the body diodes d4 and d5 of the FETs serving as the FETs Q4 and Q5. The on-state resistance of each body diode is larger than that of a diode employed in the circuit shown in FIG. 1. This poses a problem that larger losses ensue. For specifying the period during which the FETs Q4 and Q5 are off without turning them on or off, the control circuit 1 is requested to produce another control signal that lags by a given time interval. This poses a problem that the control circuit becomes unduly complex.

Figure 5:
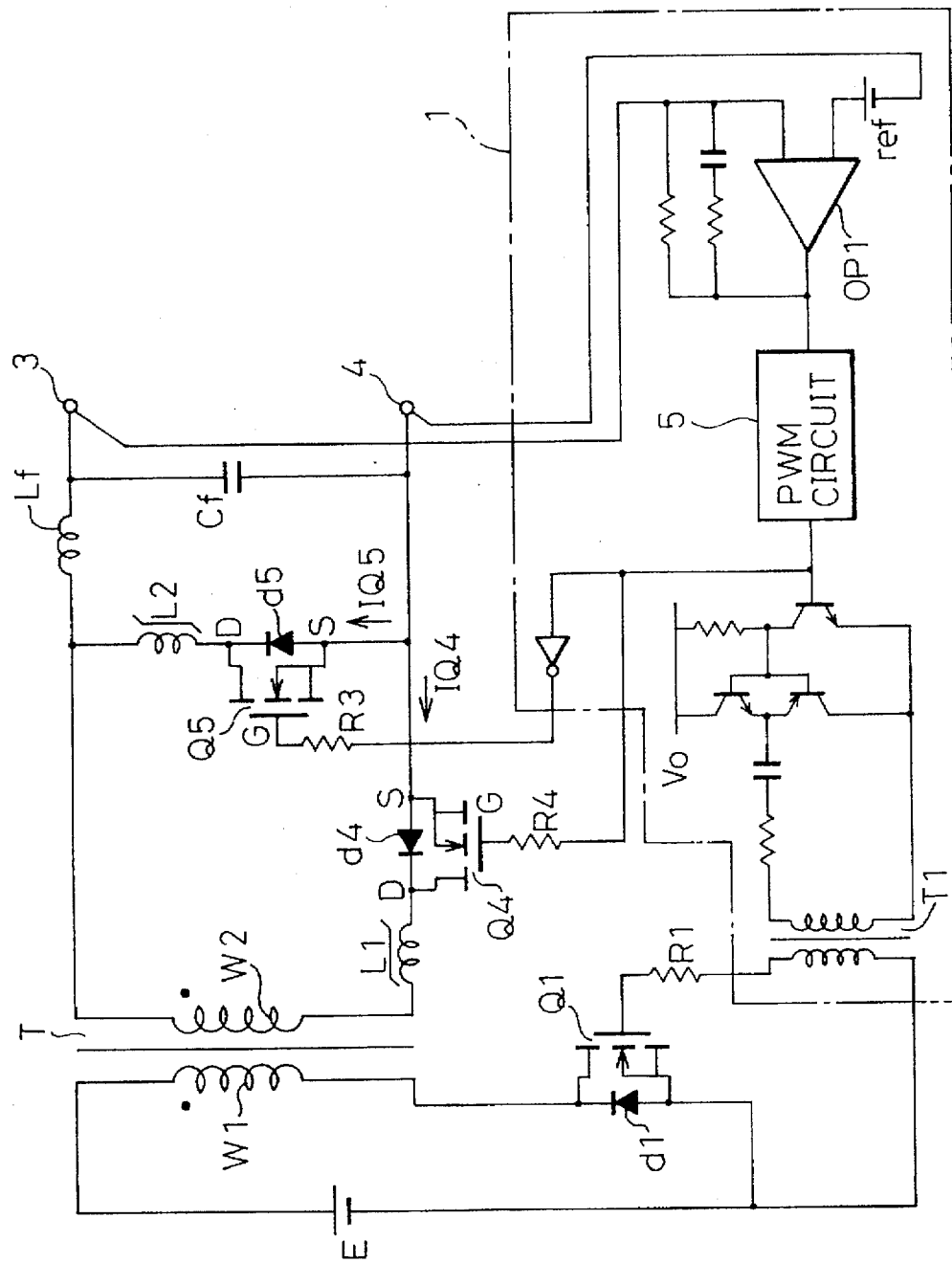
FIG. 5 shows the circuitry of a synchronous rectifier type DC-to-DC converter of the first embodiment of the present invention.
Figure 6:
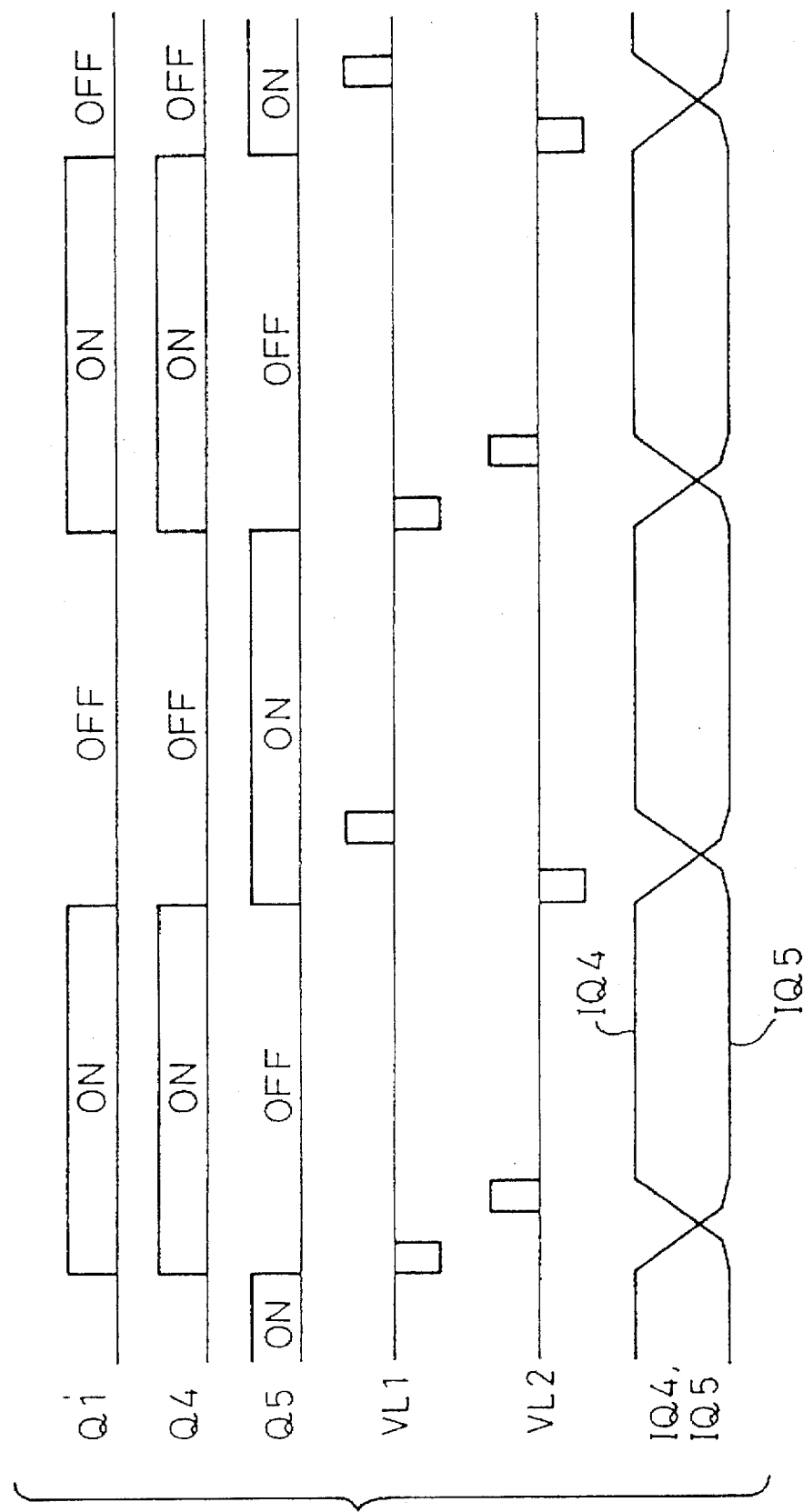
FIG. 6 is a timing chart indicating the operations of the converter shown in FIG. 5.

FIG. 5 shows the circuitry of a DC-to-DC converter of the first embodiment of the present invention, and FIG. 6 is a timing chart showing the operations of the DC-to-Dc converter shown in FIG. 5. The DC-to-DC converter shown in FIG. 5 is referred to as a step-down DC-to-DC converter for converting a direct current stemming from a high voltage into a direct current at a low voltage. The subsequent embodiments will be described by taking the step-down DC-to-DC converter for instance.

In FIG. 5, there are shown a control circuit 1, DC voltage output terminals 3 and 4, a pulse width modulation (PWM) circuit 5 included in the control circuit 1, a battery or DC power source E of a rectified AC voltage, a transformer T, a primary winding W1, a secondary winding W2, an FET Q1 acting as a primary switch, an FET Q4 acting as a rectifier synchronous rectification switch, an FET Q5 acting as a flywheel synchronous rectification switch, a smoothing choke coil Lf, a smoothing capacitor Cf, body diodes (parasitic diodes) d4 and d5 of the FETs Q4 and Q5, resistors R1, R4, and R5 located along a route of a control signal to be applied from the control circuit 1 to the gates of the FETs Q1, Q4, and Q5, a saturable inductor L1 connected in series with the FET Q4, and a saturable inductor L2 connected in series with the FET Q5. The saturable inductors may be called saturable reactors.

The illustrated control circuit 1 is identical to that employed in the prior art shown in FIG. 3. The constitution and operations will be described briefly. The control circuit 1 controls the on period of the FET Q1 by comparing an output DC voltage between the output terminals 3 and 4 with a set reference voltage. When the output DC voltage is higher than the set reference voltage, the on period of the FET Q1 is made shorter. When the output DC voltage is lower, the on period thereof is made longer. The control circuit 1 produces a control signal to be applied to the gates of the FETs Q4 and Q5. An operational amplifier OP1 compares a voltage between the output terminals 3 and 4 with a reference voltage ref, and outputs a signal whose voltage level corresponds to the voltage between the output terminals 3 and 4. The PWM circuit 5 compares a triangular wave signal with an output of the operational amplifier OP1, and produces a pulsating signal of a given cycle having a pulse duration varied depending on the level of the output of the operational amplifier OP1. The pulsating signal is applied to the gate of the FET Q4. A signal that is opposite in polarity to that of the pulsating signal is applied to the gate of the FET Q4 and to the transformer T1 at the same time. Another pulsating signal whose voltage level corresponds to that of the pulsating signal is developed on the secondary side of the transformer T1, and applied to the gate of the FET Q1.

With the foregoing signal sent from the control circuit, the FETs Q1, Q4, and Q5 are turned on or off as indicated in FIG. 6. When an on-off change signal is applied from the control circuit 1 to the gates of the FETs Q1, Q4, and Q5, a gate current flows along a route from a resistor through a gate G, a source S, and a body diode to a drain D. The on and off states of the FETs Q1, Q4, and Q5 are changed. After the FET Q1 is turned on, when a current flows from the DC power source E to the primary winding W1 of the transformer T, control is given so that the FET Q4 is turned on and the FET Q5 is turned off. A voltage induced in the secondary winding W2 of the transformer T causes a current to charge the capacitor Cf after passing through the FET Q4, saturable inductor L1, and choke coil Lf, and is output as a DC voltage through the output terminals 3 and 4. By contrast, when the FET Q1 is turned off, control is given so that the FET Q4 is turned off and the FET Q5 is turned on. A current produced by energy stored in the choke coil Lf flows through the FET Q5 and saturable inductor L2. The FETs Q4 and Q5 are controlled synchronously with the FET Q1 acting as a primary switch, and then rectify an induced voltage in the secondary winding of the transformer T.

When the FET Q4 is changed from an on state to an off state and the FET Q4 is changed from the off state to the on state, the FET Q5 is turned on before the FET Q4 is fully turned off. This causes the current flowing into the FET Q5 to increase. At this time, the saturable inductor L2 acts as an inductor so as to suppress an increase in the current flowing into the FET Q5. At this time, a voltage VL2 across the saturable inductor L2 is, as shown in FIG. 6, negative. When the current flowing into the FET Q5 further increases, the saturable inductor L2 is saturated and does not act as an inductor. The voltage VL2 becomes zero. When the FET Q4 is changed from the off state to the on state and the FET Q5 is changed from the on state to the off state, the FET Q4 is turned on before the FET Q5 is fully turned off. This causes the current flowing into the FET Q4 to increase. At this time, the saturable inductor L1 acts as an inductor so as to suppress an increase in the current flowing into the FET Q4. At this time, a voltage VL1 across the saturable inductor L1 is, as shown in FIG. 6, negative. When the current flowing into the FET Q4 further increases, the saturable inductor L1 is saturated and does not act as an inductor any longer and the voltage VL1 becomes zero. Regarding variations in the currents IQ4 and IQ5 flowing into the FETs Q4 and Q5 caused by a change of the on and off states, as shown in FIG. 6, since the rise of the currents IQ4 and IQ5 is delayed by the saturable inductors L1 and L2, even if the states of the FET Q4 and FET Q5 are changed according to the same timing, a state in which a large current flows into the FET Q4 and FET Q5 simultaneously, that is, a short-circuited state of the secondary winding W2 of the transformer T can be avoided.

The saturable inductors L1 and L2 are preferably located at positions not affecting a state change speed at which the states of the FET Q4 and FET Q5 are changed. In FIG. 5, the control circuit 1 shares the same power source with the output terminal 4. A signal applied from the control circuit 1 to the gate of the FET Q4 causes a gate current to flow along a route from the resistor R4, a gate G, and a source S. Consequently, the FET Q4 is turned on. If the saturable inductor L1 is connected to the source S, the saturable inductor L1 delays the rise of the gate current. This is not preferable. The same applies to the saturable inductor L2 and FET Q5. It is therefore preferable that the saturable inductors L1 and L2 are connected to the drains of the FETs. Moreover, since the saturable inductors L1 and L2 are used to delay the rise of currents flowing into FETs, ordinary inductive devices may be employed.

Figure 7:
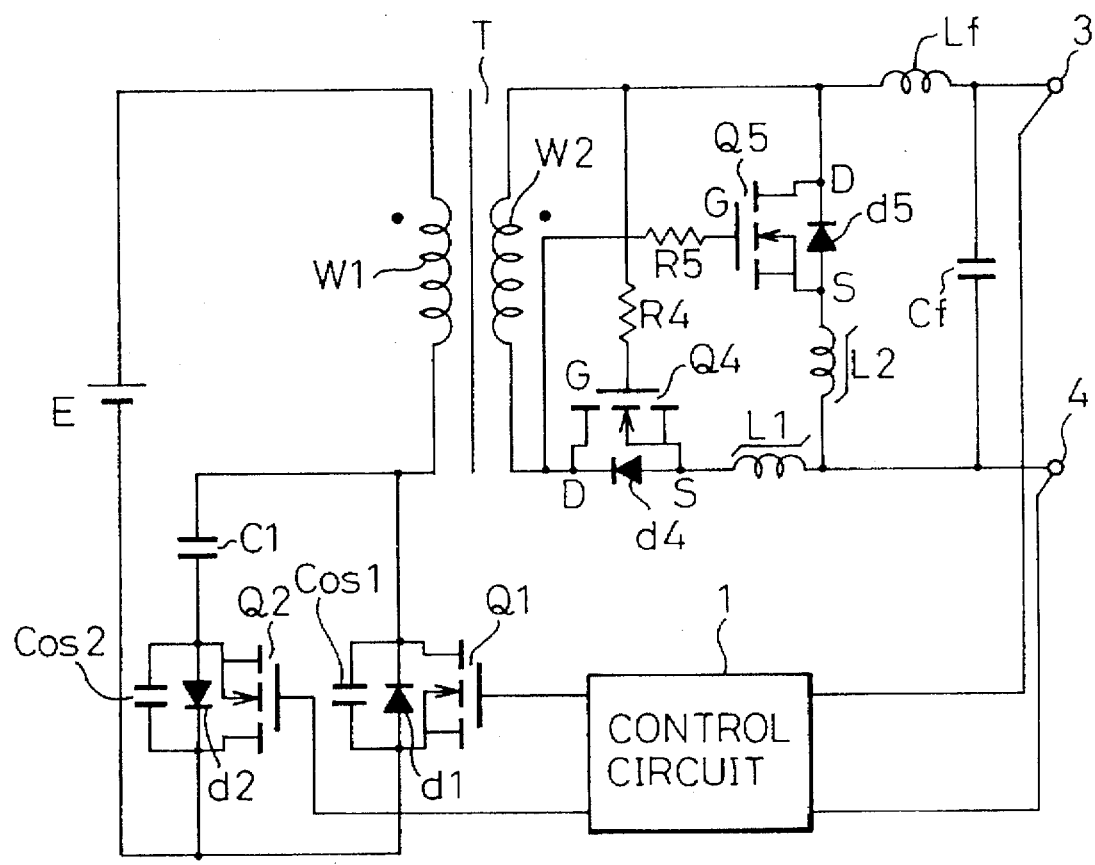
FIG. 7 shows the circuitry of a synchronous rectifier type DC-to-DC converter of the second embodiment of the present invention.

FIG. 7 shows the circuitry of a DC-to-DC converter of the second embodiment. As is apparent from comparison with the circuit of the first embodiment shown in FIG. 5, the circuit of the second embodiment is different from the circuit of the first embodiment in the points that a circuit made by connecting an FET Q2 acting as an auxiliary switch in series with a capacitor C1 is connected in parallel with the FET Q1, that the gates G of the FETs Q4 and Q5 are connected to both ends of the secondary winding W2 via the resistors R4 and R5, and that the saturable inductors L1 and L2 are connected to the sources of the FETs Q4 and Q5. d2 denotes a body diode of the FET Q2, and Cos1 and Cos2 denote parasitic capacitors of the FETs Q1 and Q2. The series circuit composed of the FET Q2 and capacitor C1 is the same circuit as the snubber circuit shown in FIG. 2A for clamping a voltage, which is applied to the FET Q1 when the FET Q1 is off, to a voltage VC1 across the capacitor C1 via the FET Q2.

The DC-to-DC converter of the second embodiment is a self-driven synchronous rectification circuit. Owing to the snubber circuit, the induced voltage in the secondary winding of the transformer T becomes a rectangular wave and a signal identical to a driving signal used to drive the FET Q1 is developed across the secondary winding. The signal identical to the driving signal used to drive the FET Q1 is applied to the gate G of the FET Q4 via the resistor R4, and a signal that is opposite in polarity to the driving signal used to drive the FET Q1 is applied to the gate G of the FET Q5 via the resistor R5. This obviates the necessity of applying a signal from the control circuit 1 to the FETs Q4 and Q5. The control circuit 1 has the same circuitry as the control circuit shown in FIG. 5 but does not output a signal to be applied to the FETs Q4 and Q5.

With a signal sent from the control circuit 1, the FET Q1 acting as a primary switch is turned on. When a current flows from the DC power source E to the primary winding W1 of the transformer T, a voltage is induced in the secondary winding W2 of the transformer T. When a voltage developed at one end of the secondary winding W2 is applied to the gate G of the FET Q4, the FET Q4 is turned on. At this time, a voltage at the other end of the secondary winding W2 is applied to the gate G of the FET Q5. However, since the voltage is low, the FET Q5 is not turned on. A drain current of the FET Q4 flows through the saturable inductor L1 and choke coil Lf, charges the capacitor Cf, and causes a DC voltage to be output through the output terminals 3 and 4. When the FET Q1 is turned off, the polarity of the induced voltage in the secondary winding W2 of the transformer T is reversed. The FET Q4 is then turned off. A gate current flows into the FET Q5 along a route from the other end of the secondary winding W2 through the resistor R5, gate G, source S, body diode d5, and drain D to one end of the secondary winding W2. The FET Q5 is then turned on. A current produced by energy stored in the choke coil Lf flows through the FET Q5.

When the FET Q4 is turned on by applying the voltage at one end of the secondary winding W2 to the gate G of the FET Q4, the gate current flows from one end of the secondary winding W2 through the resistor R1, gate G, source S, body diode d4, and drain D to the other end of the secondary winding W2. The FET Q4 is then turned on. At this time, if the saturable inductor L1 is connected to the drain D, the rise of the gate current is delayed. Preferably, the saturable inductor L1 is connected to the source of the FET Q4. The same applies to the FET Q5. Even in the DC-to-DC converter of the second embodiment, since the saturable inductors L1 and L2 are connected in series with the FETs Q4 and Q5, the rise of currents flowing when the FETs Q4 and Q5 are changed from an off state to an on state is delayed to prevent the secondary winding W2 of the transformer T being short-circuited. In particular, in the DC-to-DC converter of the second embodiment, since the FETs Q4 and Q5 on the secondary side of the transformer are controlled using the induced voltage of the secondary winding W2, the states of the FETs Q4 and Q5 are changed simultaneously. The inclusion of the saturable inductors L1 and L2 is therefore especially effective in preventing the secondary winding W2 from being short-circuited even when the states of the FETs Q4 and Q5 are changed simultaneously.

Figure 8:
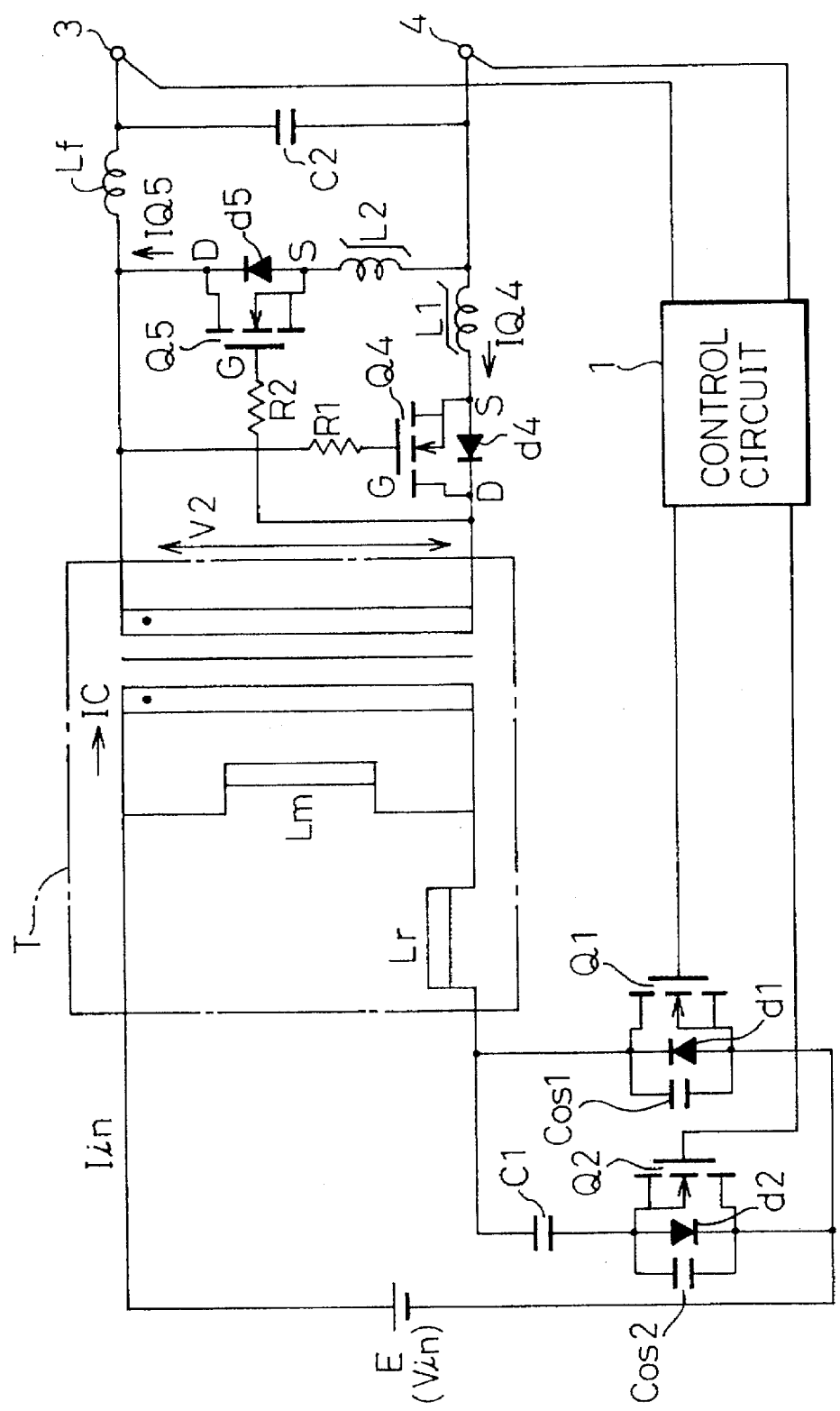
FIG. 8 shows an equivalent circuit of the circuit shown in FIG. 7.

In the circuit of the second embodiment, when a voltage applied to the FET Q1 acting as a primary switch is zero (0 V), the FET Q1 is turned off. Zero-volt switching is thus achieved for reducing a switching loss. Zero-volt switching in the DC-to-DC converter of the second embodiment will be described below. In general, a transformer includes an exciting inductor Lm and a linkage inductor Lr. FIG. 8 shows the circuitry made by adding the exciting inductor Lm and linkage inductor Lr to the circuitry shown in FIG. 7.

Figure 9:
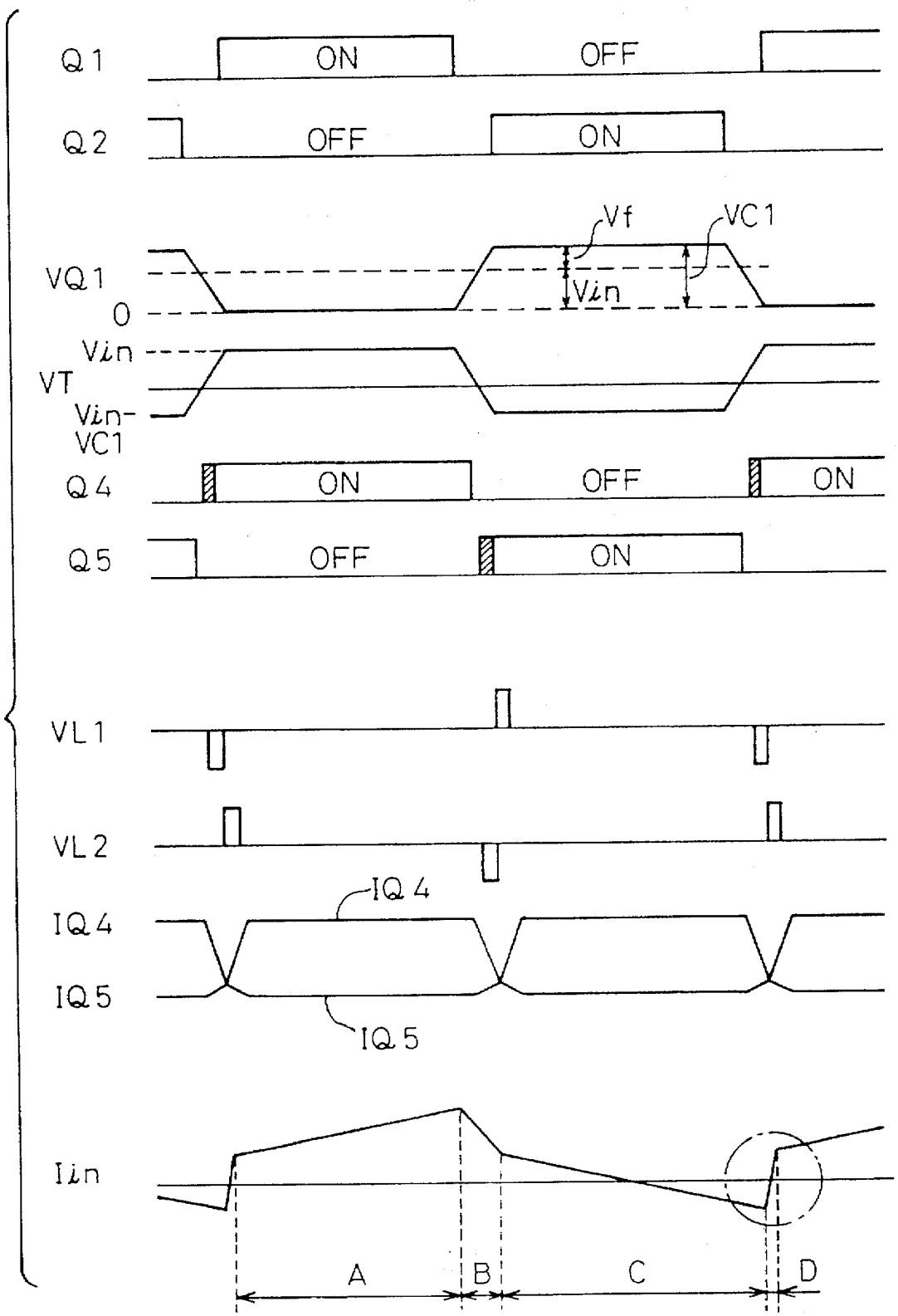
FIG. 9 is a timing chart indicating the operations of the converter shown in FIG. 8.
Figure 10:
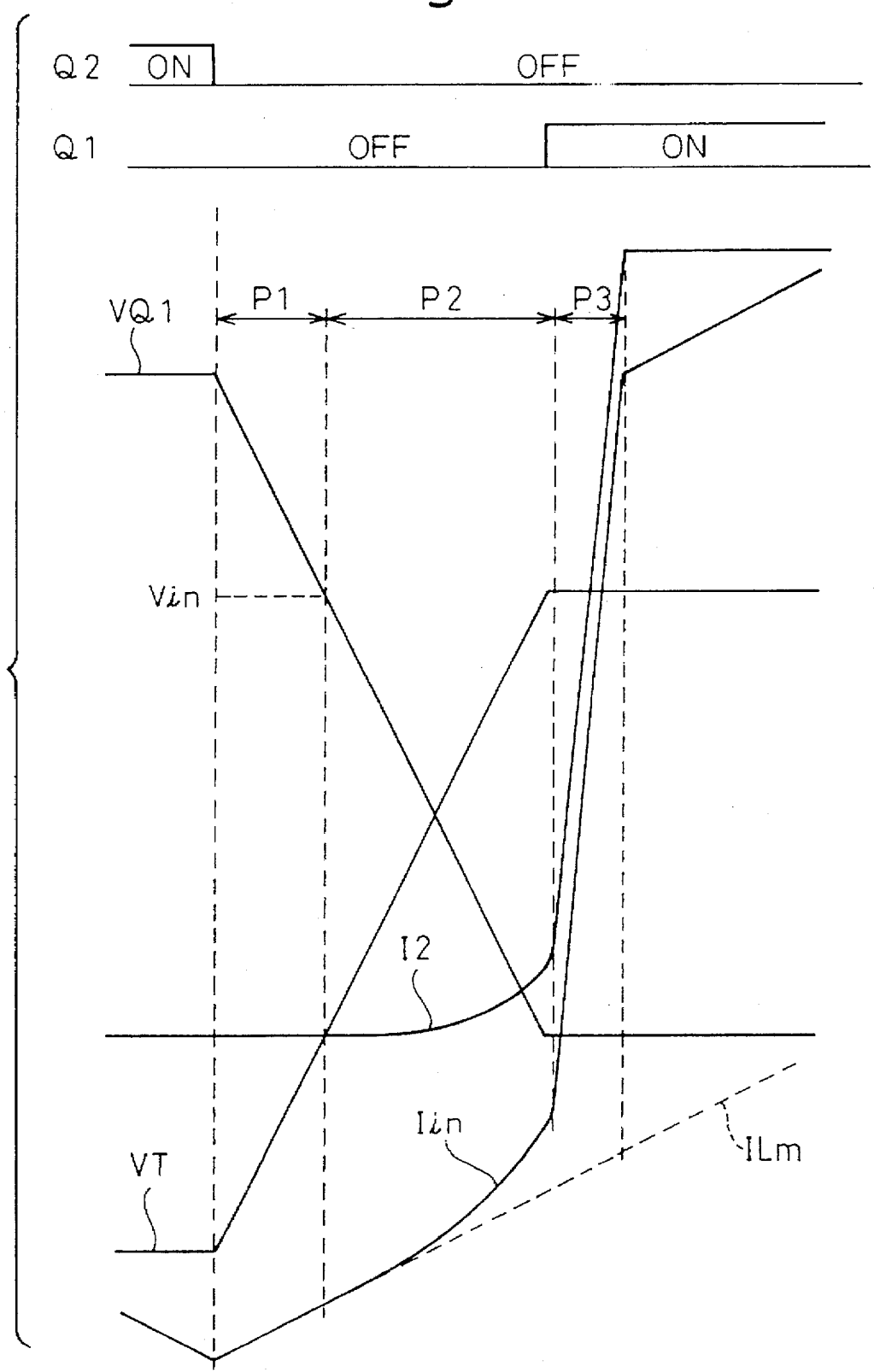
FIG. 10 is a timing chart indicating in detail some of the operations of the converter shown in FIG. 8.

FIG. 9 is a timing chart indicating the operations of the circuit shown in FIG. 8. FIG. 10 shows in detail variations occurring when the FET Q1 is changes from an off state to an on state. As shown in FIG. 8, it can be said that the exciting inductor Lm is in parallel with the inductors of the transformer and the linkage inductor Lr is in series therewith. In an ideal transformer, an exciting inductance Lm is infinite and a linkage inductance Lr is zero.

As shown in FIG. 9, turning on or off the FET Q1 and FET Q2 is controlled so that there is a period during which both the FETs are off. When the FET Q1 is on and the FET Q2 is off, a voltage vQ1 across the FET Q1 is zero, and a voltage VT across the primary winding W1 is equal to a voltage Vin of the DC power source E. Assuming that the ratio of the numbers of turns in the transformer T is n, a voltage Vin/n is developed in the secondary winding W2. Accordingly, the FET Q4 is turned on and the FET Q5 is turned off. The current IQ4 flowing into the FET Q4 flows through the saturable inductor L1 and choke coil Lf, charges the capacitor Cf, and causes a DC voltage to be output through the output terminals 3 and 4. The current IQ5 flowing into the FET Q5 is zero. At this time, on the primary side of the transformer, the current Iin flowing from the DC power source E into the transformer T increases at a slope defined by Vin/(Lm+L1) (period A in FIG. 9). Thereafter, when the FET Q2 is off, if the FET Q is turned off, the current Iin flowing into the transformer T decreases. The counter-electromotive force in the primary winding of the transformer T causes a potential at a node between the transformer T and FET Q1 to start rising. Accordingly, the capacitor C1 is charged through the body diode d2 of the FET Q2 and the parasitic capacitor Cos1 of the FET Q1 is also charged. The current Iin flowing from the DC power source E into the transformer T decreases. At this time, the current Iin decreases at a slope defined by Vin/L1 (period B in FIG. 9). A voltage VQ1 across the FET Q1 is clamped to a voltage VC1 across the capacitor C1. Because of VC1= Vin+Vf, assuming that the ratio at which the FET Q1 is turned on at intervals of the cycle of a pulse applied to the FET Q1, that is, a duty cycle of the pulse to be applied from the control circuit 1 to the FET Q1 is k, Vf is expressed as k/(1−k)*Vin. This leads to VC1=Vin/(1−k). Since the voltage VC1 becomes larger than the voltage Vin of the DC power source E, when the FET Q1 is off, if the FET Q2 is turned on, the energy stored in the capacitor C1 is fed back to the DC power source E through the primary winding W1. A voltage VT across the transformer T is equal to Vin−VC1. A 1/n-th of the voltage VT is developed in the secondary winding W2. In other words, a negative voltage of opposite polarity is developed in the transformer T. While the voltage in the secondary winding W2 is reversing in polarity, the FET Q4 is changed from an on state to an off state and the FET Q5 is changed from the off state to the on state. At this time, as described previously, the rise of the current IQ5 flowing into the FET Q5 is delayed by the saturable inductor L2. It is therefore prevented that the secondary winding W2 is short-circuited. In a state in which the FET Q4 is turned off and the FET Q5 is turned on, the secondary winding of the transformer T is supplying power to a load using the counter-electromotive force of the choke coil Lf. In this state, on the primary side of the transformer, the current Iin flowing into the transformer T decreases at a slope defined by Vin/(Lm+L1) (period C in FIG. 9). The current Iin flowing from the power source E into the transformer T becomes negative, that is, the energy is refluxed from the capacitor C1 to the power source E.

Thereafter, the FET Q2 is turned off and the FET Q1 is turned on. This operation will be described with reference to FIG. 10. When the FET Q2 is turned off, a current flowing from the capacitor C1 into the power source E via the exciting inductor Lm is blocked. At this time, the parasitic capacitor Cos1 of the FET Q1 is charged at the voltage VC1 (=Vin+Vf). The voltage is applied across the FET Q1. After the parasitic capacitor Cos1 is discharged, when the voltage VQ1 across the FET Q1 becomes zero, the FET Q1 is turned on. Zero-volt switching is thus realized. When the FET Q2 is turned off, the parasitic capacitor Cos1 of the FET Q1 is started to be discharged. The voltage vQ1 starts decreasing. During period P1 until the voltage VT becomes zero, the FET Q4 on the secondary side of the transformer is off, and the secondary side of the transformer T is opened. During period P1, therefore, the current Iin increases at a slope defined by VT/(Lm+L1). When the voltage VT becomes equal to or larger than zero, the FET Q4 on the secondary side of the transformer is turned on and the FET Q5 is turned off. The body diode d4 of the FET Q4 is turned on. Since the saturable inductor L2 is saturated, the saturable inductor L1 is in parallel with the exciting inductor Lm. The current Iin increases at a slope defined by $VT*(Lr(Lm+n^2L1)+Lm, n^2L1)/(Lm+n^2L1)$. This increase continues until the saturable inductor L1 is saturated. Period 3 is a period after the saturable inductor L1 is saturated. During period 3, the FET Q4 is turned on, and the body diode d4 is turned on. Since the saturable inductors L1 and L2 are saturated, the secondary side of the transformer T is short-circuited. A short circuit therefore occurs across the exciting inductor Lm. The current Iin increases rapidly at a slope defined by VT/Lr.

During periods P1 and P2, the charge in the parasitic capacitor Cos1 is discharged via the exciting inductor Lm. The current Iin varies as mentioned above. The amount of charge to be discharged during periods P1 and P2 is given as an amount calculated by integrating $Lm*Iin^2$ relative to the time coincident with the periods. If conditions are set so that the amount of charge to be discharged via the exciting inductor Lm during periods P1 and P2 becomes substantially equal to the charge stored in the parasitic capacitor Cos1 of the FET Q1, when period P1 comes to an end, the charge in the parasitic capacitor Cos1 is nearly completely discharged. The voltage VQ1 across the FET Q1 becomes substantially zero. Control is therefore given so that the FET Q1 is turned on at that time. For discharging the parasitic capacitor Cos1 within periods P1 and P2, it is necessary to meet the condition of $Lm*Iin^2/2>Cos,VC1^2/2$.

As mentioned above, in the DC-to-DC converter of the second embodiment, after the FET Q2 is turned off, until the FET Q1 is turned on, the parasitic capacitor Cos1 of the FET Q1 is discharged via the exciting inductor Lm of the transformer T. Thus, zero-volt switching is achieved.

Figure 11:
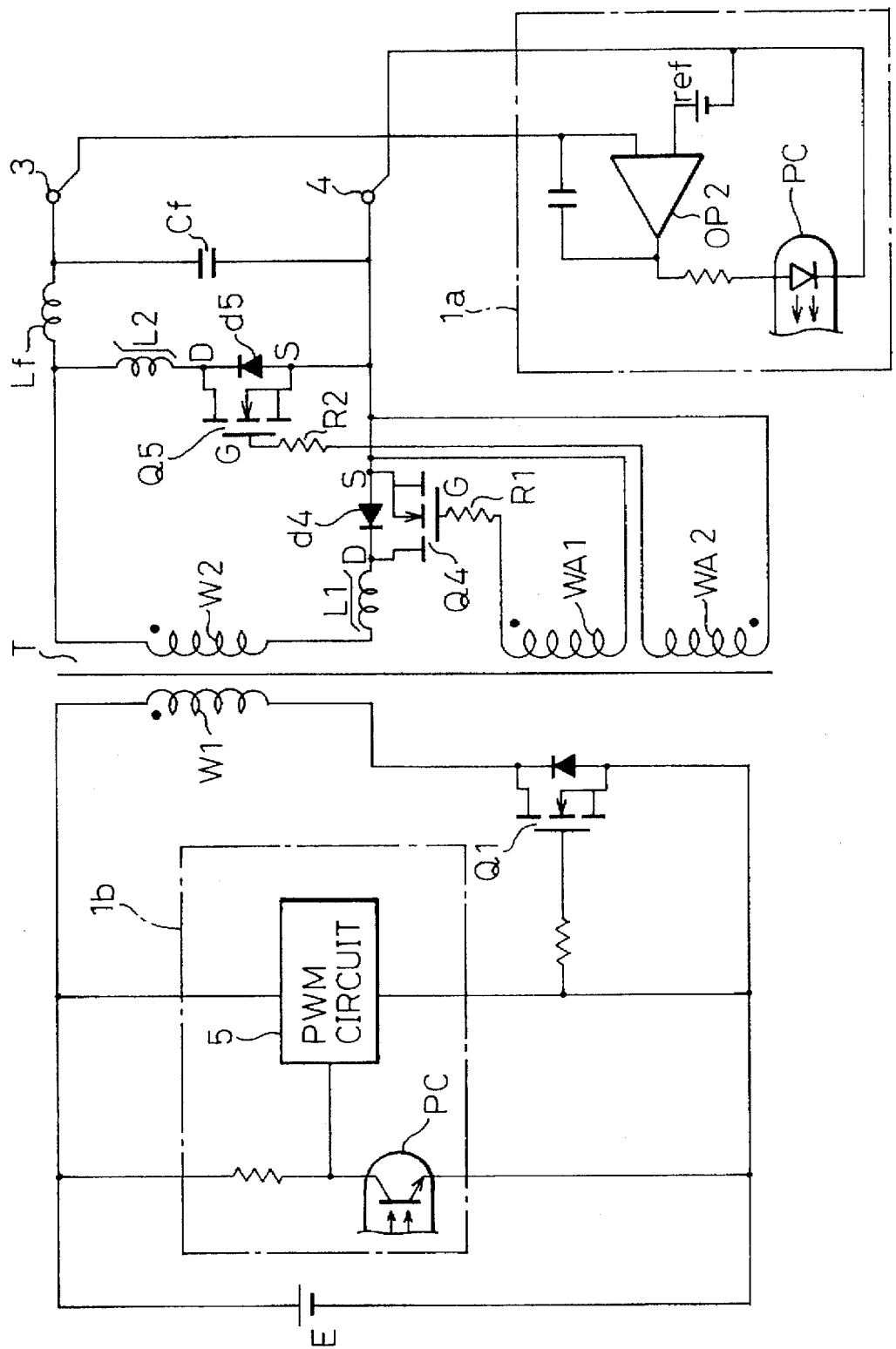
FIG. 11 shows the circuitry of a synchronous rectifier type DC-to-DC converter of the third embodiment of the present invention.

FIG. 11 shows the circuitry of a DC-to-DC converter of the third embodiment. Differences from the circuit of the first embodiment shown in FIG. 5 lie in that auxiliary windings WA1 and WA2 sharing the core of the transformer T are included, and voltages induced in the auxiliary windings WA1 and WA2 are applied to the FETs Q4 and Q5, and that the control circuit 1 is divided into a circuit 1a on the secondary side of the transformer and a circuit 1b on the primary side thereof.

In the circuit shown in FIG. 5, the control circuit 1 detects a voltage level at the output terminals on the secondary side of the transformer, produces a pulsating signal used to define a period during which the FET Q1 is on, changes the levels of the signal, and then applies the signal to the gate G of the FET Q1. By contrast, in the third embodiment, the control circuit 1a on the secondary side of the transformer detects the voltage level at the output terminals on the secondary side, drives a light-emitting diode of a photocoupler PC according to the voltage level so as to produce light, and then sends the light to the control circuit 1b on the primary side of the transformer. In the control circuit 1b, a phototransistor of the photocoupler PC converts the light into an electric signal. The PWM circuit 5 then produces a pulsating signal whose duty cycle is dependent on the level of the electric signal, and applies the signal to the gate of the FET Q1. Owing to this constitution, the primary side of the transformer and secondary side thereof can be separated from each other. Alternatively, the PWM circuit may be installed on the secondary side and the photocoupler PC may be used to send a pulsating signal.

The auxiliary winding WA1 is wound in the same direction as the secondary winding W2 of the transformer m while the auxiliary winding WA2 is wound in a direction opposite to the secondary winding W2 of the transformer T. In the auxiliary winding WA1, a voltage is induced in the same direction as that in the secondary winding W2. In the auxiliary winding WA2, a voltage is induced in the direction opposite to that in the secondary winding W2. As described in conjunction with the circuit of the second embodiment shown in FIG. 7, a signal the same as a driving signal for driving the FET Q1 is applied to the gate of the FET Q4, while a signal that is opposite in polarity to the driving signal for driving the FET Q1 is applied to the gate G of the FET Q5. Rectification is then performed on the secondary side of the transformer in the same manner as that in the circuit of the first embodiment. When the FET Q1 is turned on, a current flows from the DC power source E to the primary winding W1 of the transformer T. Voltages are induced in the secondary winding W2 and the auxiliary windings WA1 and WA2. The induced voltage in the auxiliary winding WA1 is applied between the gate G of the FET Q4 and the source S thereof. The FET Q4 is then turned on. The induced voltage in the secondary winding W2 causes a current to flow through the saturable inductor L1. The current is smoothed by the choke coil Lf and capacitor Cf, and causes a voltage to be applied to a load through the output terminals 3 and 4. At this time, the polarity of the induced voltage in the auxiliary winding WA2 is opposite to that of the induced voltage in the auxiliary winding WA1. The FET Q5 is therefore turned off. When the FET Q1 is turned off, the polarities of the induced voltages in the secondary winding W2 of the transformer T and the auxiliary windings WA1 and WA2 are reversed. The FET Q4 is turned off and the FET Q5 is turned on. A current produced by energy stored in the choke coil Lf flows through the FET Q5. Even in this case, because of a delay in operation, before one of the FETs Q4 and Q5 is fully turned off, the other FET may be turned on. However, since the rise of currents is delayed by the saturable inductors L1 and L2, it can be prevented that the secondary winding W2 of the transformer T is short-circuited.

In the embodiment shown in FIG. 11, the saturable inductors L1 and L2 are connected to the drains of the FETs Q4 and Q5. Alternatively, the inductors may be connected to the sources S thereof.

Figure 12:
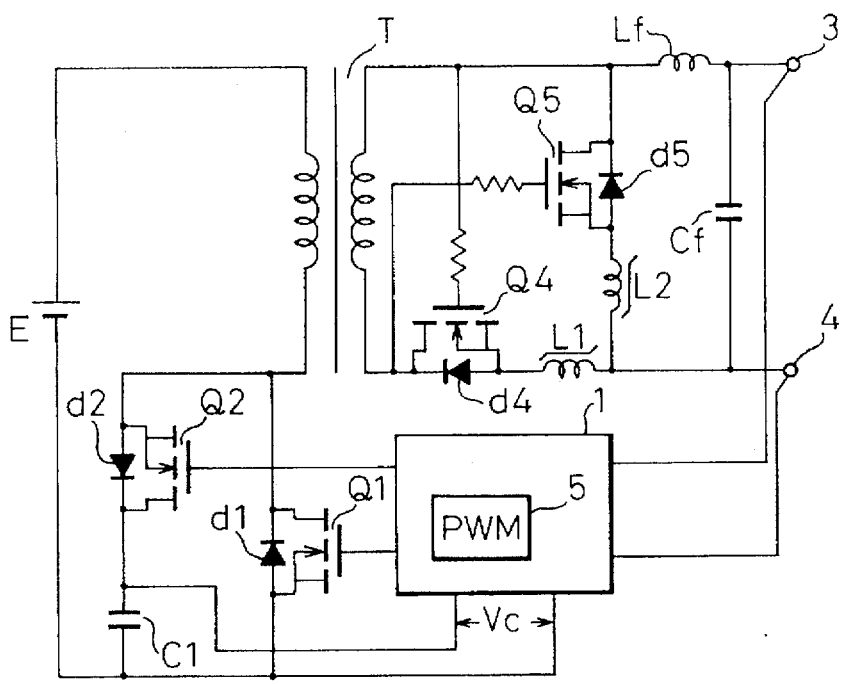
FIG. 12 shows the circuitry of a synchronous rectifier type DC-to-DC converter of the fourth embodiment of the present invention.

FIG. 12 shows the circuitry of a DC-to-DC converter of the fourth embodiment. The control circuit 1 has the circuitry similar to that of the circuit shown in FIG. 5, and compares a DC output voltage between the output terminals 3 and 4 with a set reference voltage. Control is then given so that a pulsating signal making the on period of the FET Q1 shorter by a time equivalent to the difference when the output DC voltage is higher than the set reference voltage, and making the on period of the FET Q1 longer when the output DC voltage is lower is output from the PWM circuit 5 to the gate of the FET Q1. When the FET Q1 is changed from an on state to an off state, control is given so that the FET Q2 is changed from the off state to the on state. With counter-electromotive force occurring when the FET Q1 is changed to the on state, the capacitor C1 is charged through the FET Q2 that is on. Incidentally, even the FET Q2 is charged via the body diode d2. The terminal voltage VC1 of the capacitor C1 is applied to the control circuit 1. Using the terminal voltage VC1 as a source voltage, the control circuit 1 controls turning on or off of the FETs Q1 and Q2. The capacitance of the capacitor C1 can therefore be determined according to the power consumption of the control circuit 1. Moreover, since the charge in the capacitor C1 constituting a snubber circuit is utilized effectively, the efficiency of the DC-to-DC converter can be improved.

Figure 13:
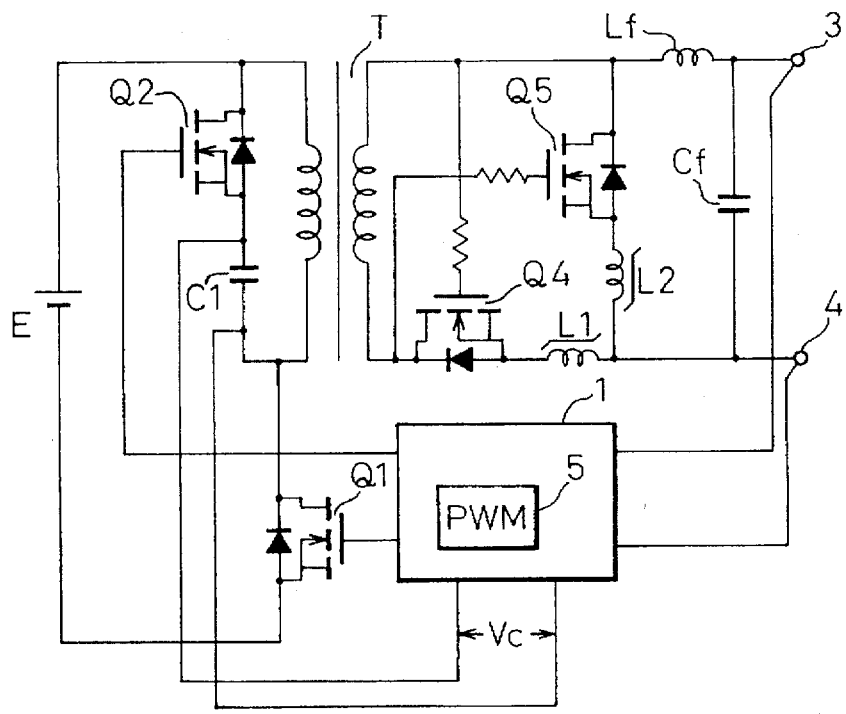
FIG. 13 shows the circuitry of a synchronous rectifier type DC-to-DC converter of the fifth embodiment of the present invention.

FIG. 13 shows the circuitry of a DC-to-DC converter of the fifth embodiment. This circuit is made by arranging the snubber circuit, which is composed of the FET Q2 and capacitor C1 and included in the circuit of the second embodiment, in parallel with the primary winding W1 of the transformer. Owing to this constitution, a surge voltage occurring when the FET Q1 is turned off is applied to the capacitor C1 via the FET Q2 that is an auxiliary switch and thus absorbed. The terminal voltage VC1 of the capacitor C1 is applied as a source voltage to the control circuit 1. This circuit is different from that of the fourth embodiment shown in FIG. 12 in the configuration of the snubber circuit. However, the constitution and operations of the rectification circuit are identical to those in the fourth embodiment. The description of the constitution and operations will therefore be omitted.

Figure 14:
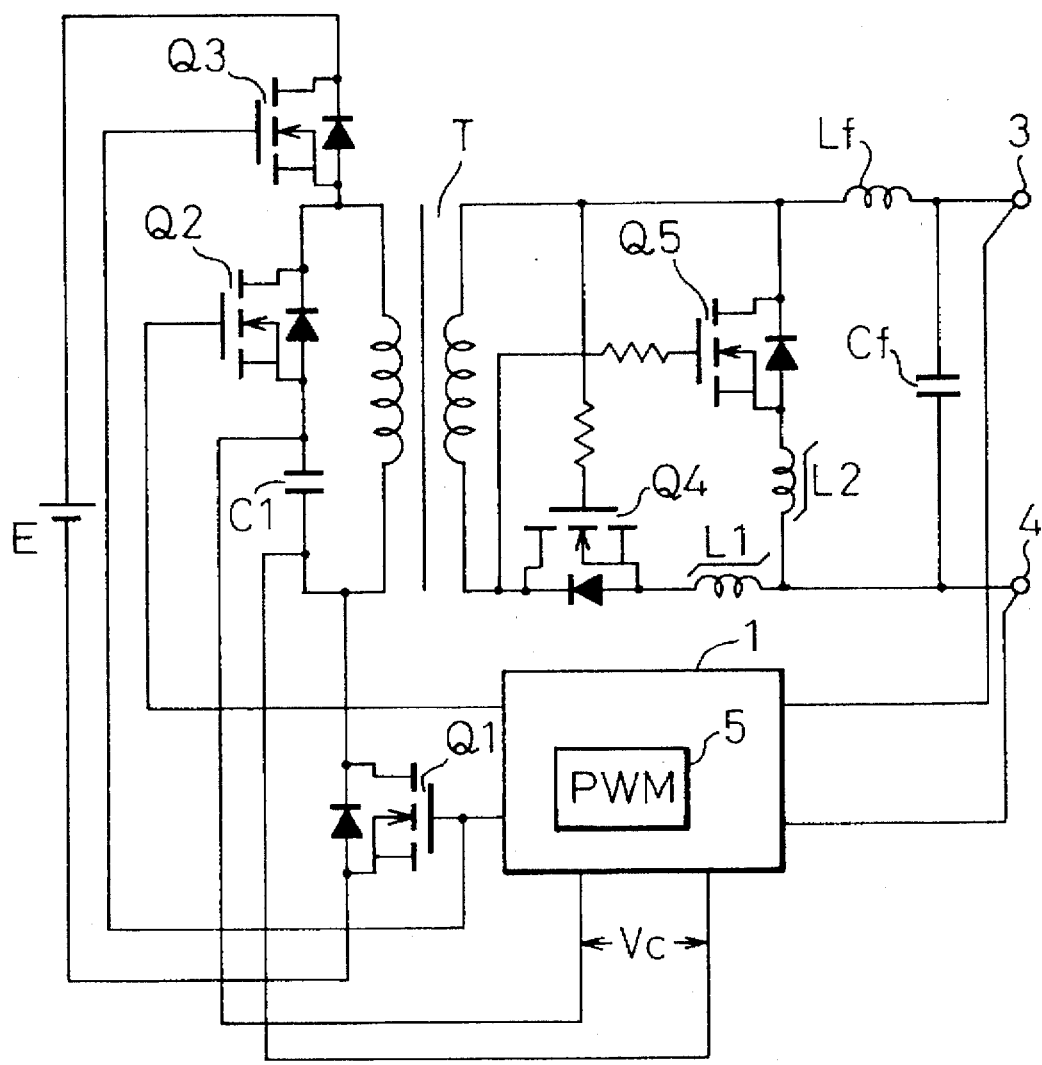
FIG. 14 shows the circuitry of a synchronous rectifier type DC-to-DC converter of the sixth embodiment of the present invention.

FIG. 14 shows the circuitry of a DC-to-DC converter of the sixth embodiment. This circuit is a double transistor type DC-to-DC converter in which an FET Q3 acting as a second primary switch is added to the circuit shown in FIG. 13. The FET Q3 is controlled with the same signal as the FET Q1. The constitution and operations of the rectification circuit are identical to those in the circuit shown in FIG. 13. The description of the constitution and operations will therefore be omitted.

Figure 15:
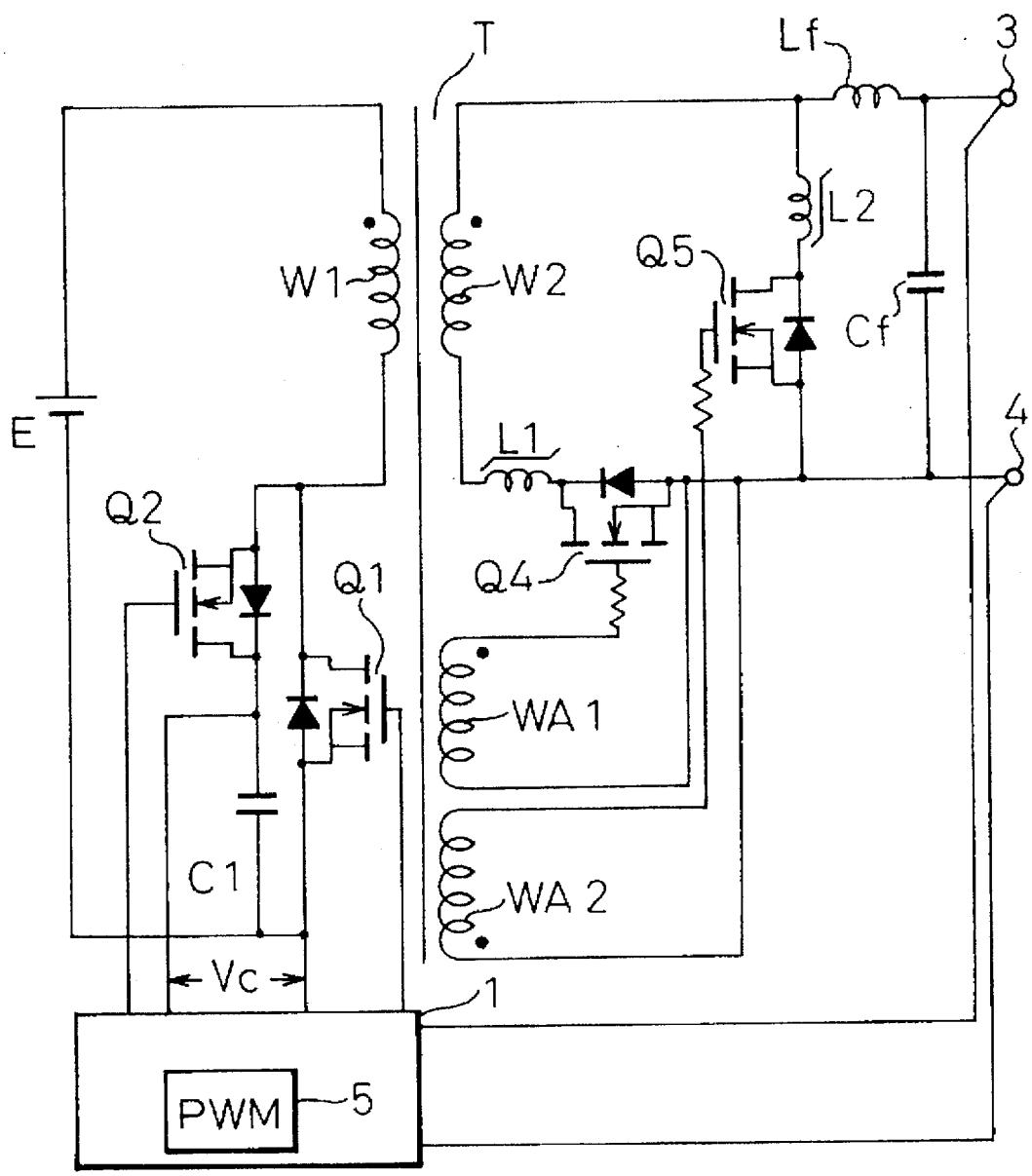
FIG. 15 the circuitry of a synchronous rectifier type DC-to-DC converter of the seventh embodiment of the present invention.

FIG. 15 shows the circuitry of a DC-to-DC converter of the seventh embodiment. This circuit is such that the auxiliary windings WA1 and WA2 shown in FIG. 11 are added to the circuit shown in FIG. 12. The induced voltages in the auxiliary windings are used to control the FET Q4 and FET Q5. The circuit has the features of both the circuits shown in FIGS. 11 and 12. The operations and the like are identical to those of the circuits shown in FIGS. 11 and 12. The description of the operations will therefore be omitted.

Figure 16:
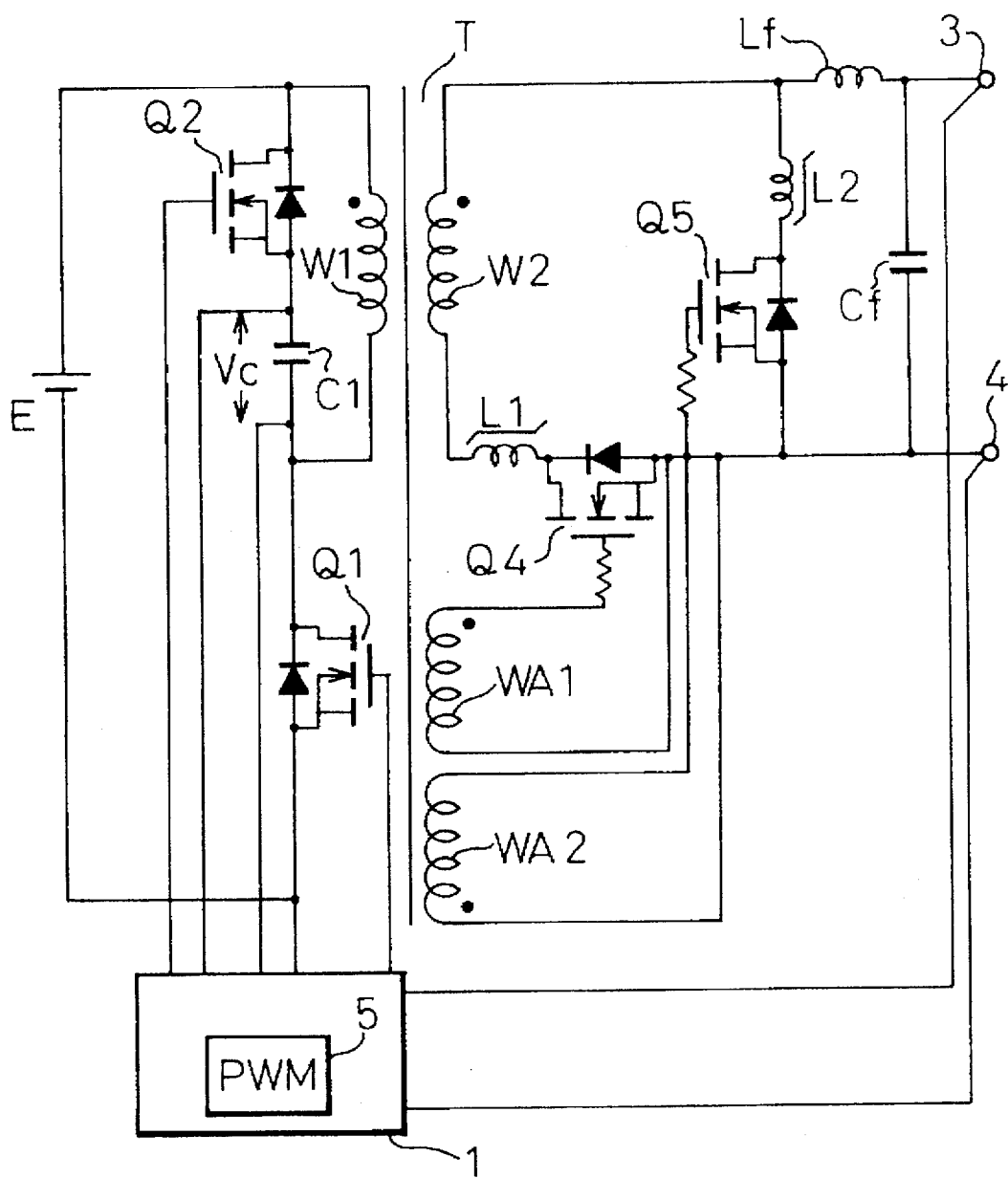
FIG. 16 shows the circuitry of a synchronous rectifier type DC-to-DC converter of the eighth embodiment of the present invention.

FIG. 16 shows the circuitry of a DC-to-DC converter of the eighth embodiment. This circuit is such that the auxiliary windings WA1 and WA2 shown in FIG. 11 are added to the circuit shown in FIG. 13. The induced voltages in the auxiliary windings are used to control the FET Q4 and FET Q5. The circuit has the features of both the circuits shown in FIGS. 11 and 13. The operations and the like are identical to those of the circuits shown in FIGS. 11 and 13. The description of the operations will therefore be omitted.

Figure 17:
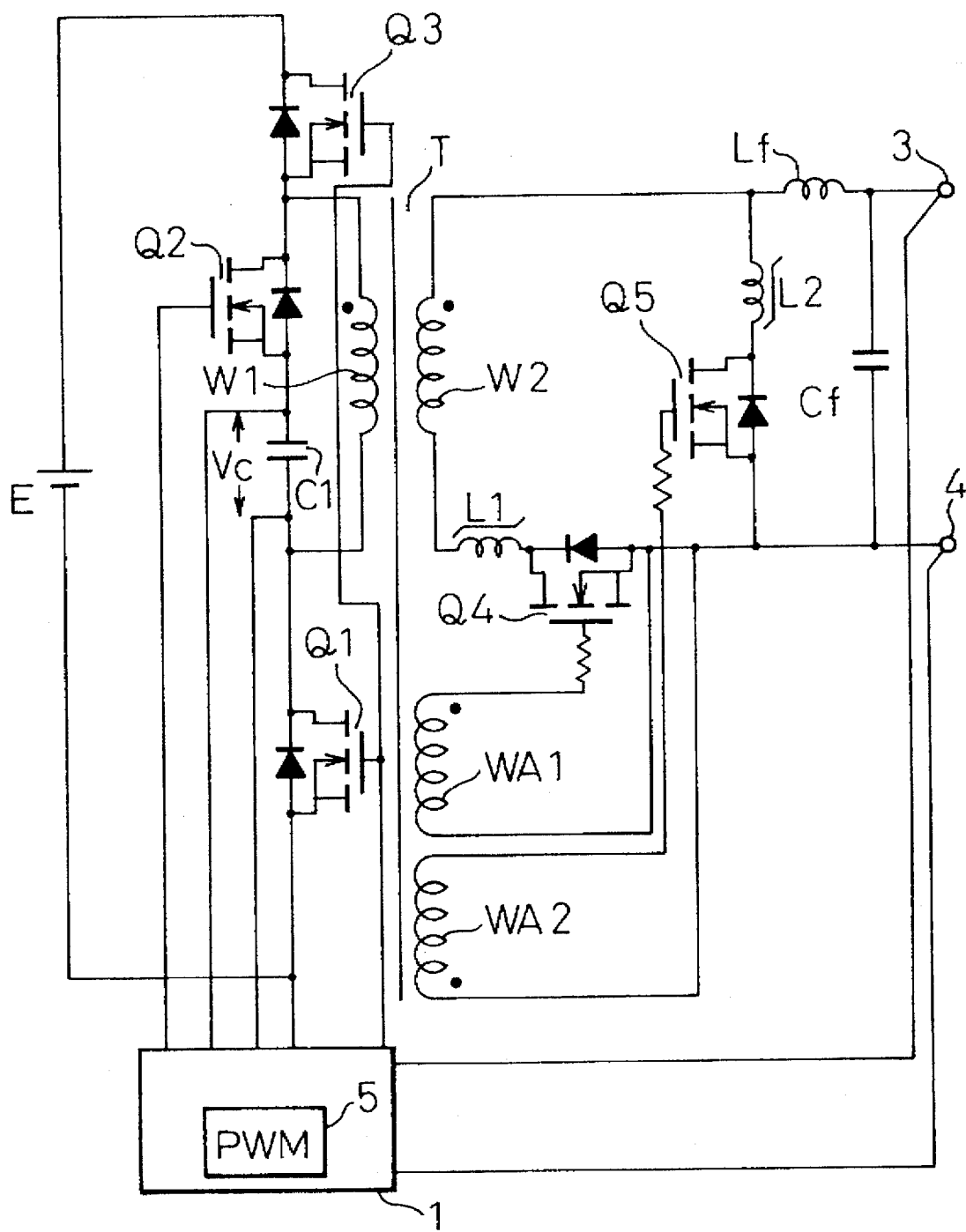
FIG. 17 shows the circuitry of a synchronous rectifier type DC-to-DC converter of the ninth embodiment of the present invention.

FIG. 17 shows the circuitry of a DC-to-DC converter of the ninth embodiment. This circuit is such that the auxiliary windings WA1 and WA2 shown in FIG. 11 are added to the two transistor type DC-to-DC circuit shown in FIG. 14. The induced voltages in the auxiliary windings are used to control the FET Q4 and FET Q5. The circuit has the features of both the circuits shown in FIGS. 11 and 14. The operations and the like are identical to those of the circuits shown in FIGS. 11 and 14. The description of the operations will therefore be omitted.

Figure 18:
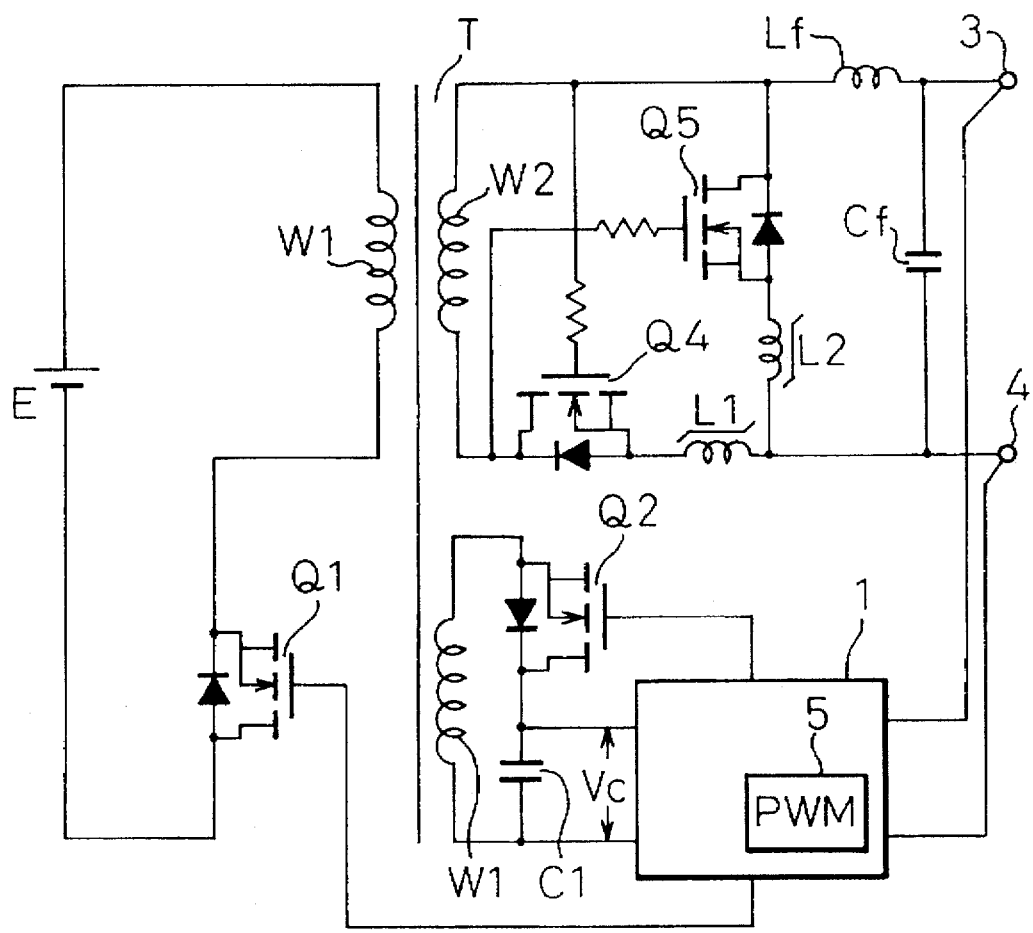
FIG. 18 shows the circuitry of a synchronous rectifier type DC-to-DC converter of the tenth embodiment of the present invention.

FIG. 18 shows the circuitry of a DC-to-DC converter of the tenth embodiment. This circuit is such that a tertiary winding W3 is included in the transformer T in the DC-to-DC converter shown in FIG. 7, and the snubber circuit composed of the FET Q2 and capacitor C1 is connected to the tertiary winding W3. The snubber circuit is equivalent to the snubber circuit connected to the primary winding W1. By properly determining the number of turns of the tertiary winding, a voltage required by the control circuit 1 can be provided readily. In particular, when the voltage of the DC power source E is high, if the number of turns of the tertiary winding W3 is determined properly, an FET Q2 that is less resistive to a high voltage can be utilized. This is advantageous.

Figure 19:
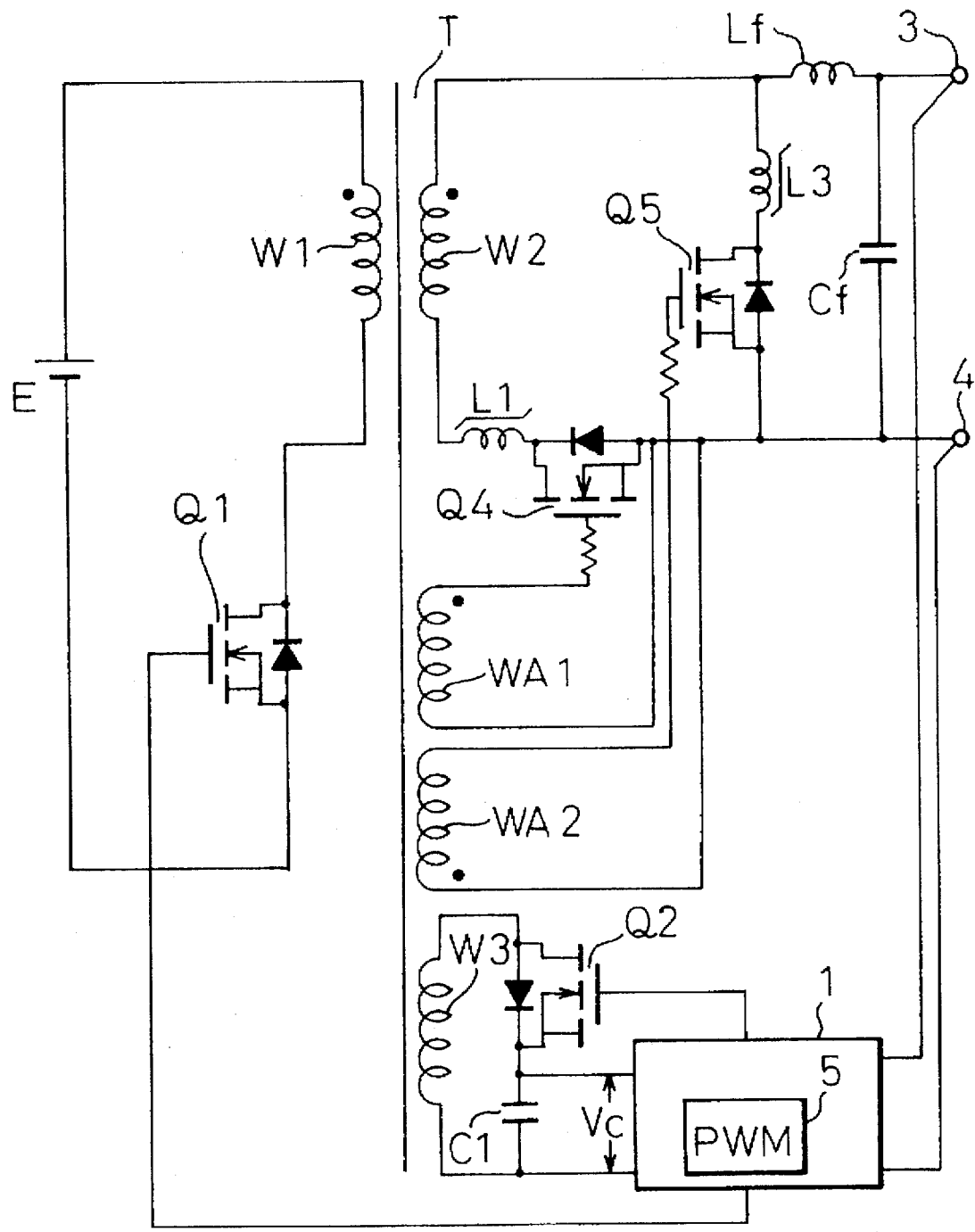
FIG. 19 shows the circuitry of a synchronous rectifier type DC-to-DC converter of the eleventh embodiment of the present invention.

FIG. 19 shows the circuitry of a DC-to-DC converter of the eleventh embodiment. This circuit is such that the auxiliary windings WA1 and WA2 shown in FIG. 11 are added to the circuit shown in FIG. 18. The induced voltages in the auxiliary windings are used to control the FET Q4 and FET Q5. The circuit has the features of both the circuits shown in FIGS. 11 and 18. The operations and the like are identical to those of the circuits shown in FIGS. 11 and 18. The description of the operations will therefore be omitted.

Figure 20:
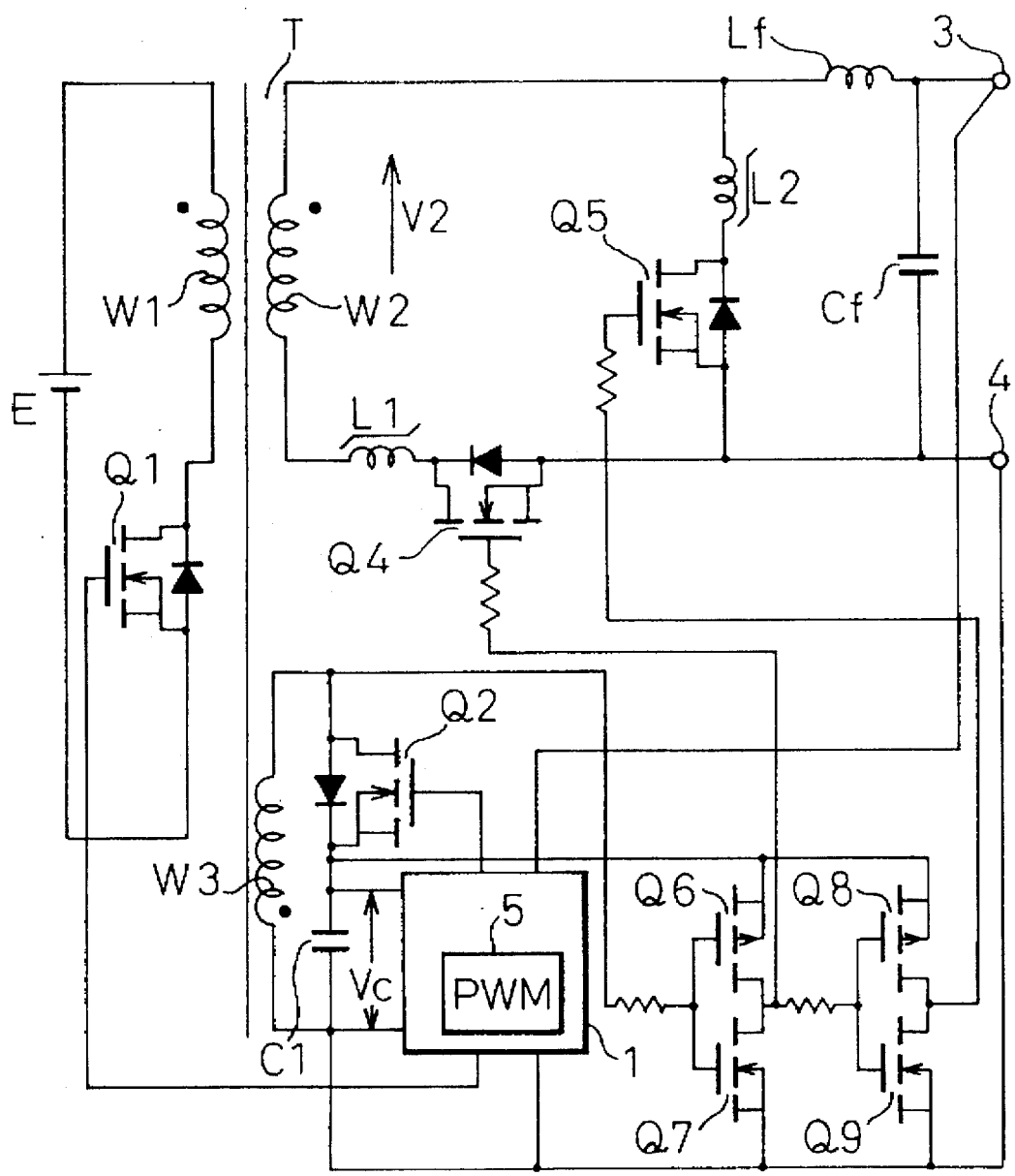
FIG. 20 shows the circuitry of a synchronous rectifier type DC-to-DC converter of the twelfth embodiment of the present invention.
Figure 21:
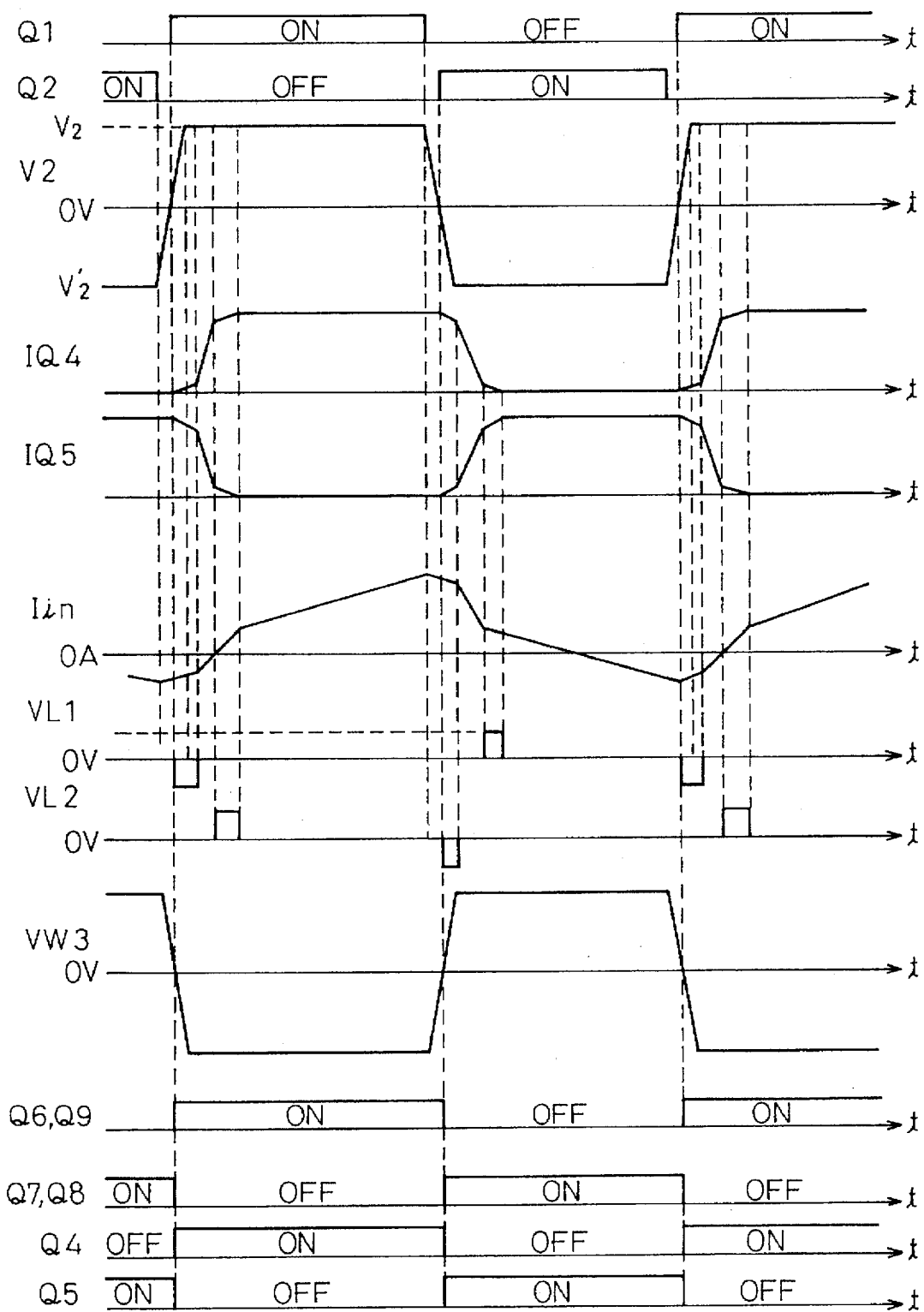
FIG. 21 is a timing chart indicating the operations of the synchronous rectifier type DC-to-DC converter of the twelfth embodiment.

FIG. 20 shows the circuitry of a DC-to-DC converter of the twelfth embodiment, and FIG. 21 is a timing chart indicating the operations of the DC-to-DC converter shown in FIG. 20. This circuit is such that the inverter circuit composed of complementary FETs Q6 and Q7, and the inverter circuit composed of the complementary FETs Q8 and Q9 are connected in two stages in the circuit shown in FIG. 18, a voltage at one end of the tertiary winding is input to the inverter circuit in the first stage, an output of the inverter circuit in the first stage is applied to the gate of the FET Q4, an output of the second stage is applied to the gate of the FET Q4, and the induced voltage in the tertiary winding is used to control the FETs Q4 and Q5. The two inverter circuits share the capacitor C1 of the snubber circuit as a power source.

The circuit elements shown in FIG. 20 operate as indicated in FIG. 21. The operations of the elements have been described so far. The description of the operations will therefore be omitted.

As described so far, according to the present invention, even if the states of a rectifier synchronous rectification switching device and a flywheel synchronous rectification switching device are changed according to the same timing, a rectifier rise delay inductive device and a flywheel rise delay inductive device delay an increase in currents flowing into the rectifier synchronous rectification switching device and flywheel synchronous rectification switching device. A short-circuited state of a secondary winding of a transformer can therefore be avoided.

We claim:

1. A DC-to-DC converter for converting a voltage of a DC power source into another voltage, comprising:
   a transformer having a primary winding thereof connected to said DC power source;
   a primary switching device connected in series with said primary winding;
   a control circuit controlling turning on or off of said primary switching device;
   a flywheel inductive device connected between a first end terminal of a secondary winding of said transformer and a first output terminal of said DC-to-DC converter;

a rectifier synchronous rectification switching device connected between a second end terminal of said secondary winding of said transformer and a second output terminal of said DC-to-DC converter;

a flywheel synchronous rectification switching device connected in parallel with said secondary winding of said transformer and positioned to form a conductive path leading from one to the other of said first and second output terminal by way of said flywheel inductive device and said flywheel synchronous rectification switching device;

a rectifier rise delay inductive device connected in series with said rectifier synchronous rectification switching device; and a flywheel rise delay inductive device connected in series with said flywheel synchronous rectification switching device.

2. A DC-to-DC converter according to claim 1, wherein said rectifier rise delay inductive device and said flywheel rise delay inductive device are saturable inductors or coils.

3. A DC-to-DC converter according to claim 1, wherein turning on or off said rectifier synchronous rectification switching device and said flywheel synchronous rectification switching device is controlled by said control circuit.

4. A DC-to-DC converter according to claim 3, wherein said rectifier synchronous rectification switching device and said flywheel synchronous rectification switching device are field effect transistors, and said rectifier rise delay inductive device and said flywheel rise delay inductive device are connected, respectively, to the corresponding drains of said rectifier synchronous rectification switching device and said flywheel synchronous rectification switching device.

5. A DC-to-DC converter according to claim 1, wherein turning on or off of each of said rectifier synchronous rectification switching device and said flywheel synchronous rectification switching device is controlled using an induced voltage in said secondary winding of said transformer.

6. A DC-to-DC converter according to claim 5, wherein said rectifier synchronous rectification switching device and said flywheel synchronous rectification switching device are respective field effect transistors, and the corresponding gates of said respective field effect transistors forming said rectifier synchronous rectification switching device and said flywheel synchronous rectification switching device are connected to respective, opposite ends of said secondary winding of said transformer via respective resistors.

7. A DC-to-DC converter according to claim 6, wherein said rectifier rise delay inductive device and said flywheel rise delay inductive device are connected to the corresponding sources of said respective field effect transistors forming said rectifier synchronous rectification switching device and said flywheel synchronous rectification switching device.

8. A DC-to-DC converter according to claim 1, wherein said transformer includes auxiliary windings, and turning on or off of each of said rectifier synchronous rectification switching device and said flywheel synchronous rectification switching device is controlled using voltages induced in said auxiliary windings of said transformer.

9. A DC-to-DC converter according to claim 1, wherein a series circuit of an auxiliary switching device connected in series with an auxiliary capacitive device is connected in parallel with said primary switching device.

10. A DC-to-DC converter according to claim 9, wherein said control circuit controls turns said auxiliary switching device on or off so that the state of said auxiliary switching device is opposite to that of said primary switching device.

11. A DC-to-DC converter according to claim 10, wherein said control circuit provides control so that there is a period during which both said auxiliary switching device and said primary switching device are off.

12. A DC-to-DC converter according to claim 9, wherein a terminal voltage of said auxiliary capacitive device is applied as a source voltage to said control circuit.

13. A DC-to-DC converter according to claim 9, further comprising a second primary switching device connected in series with said primary winding at a first end terminal thereof, said primary switching device being connected to a second, opposite end terminal of said primary winding, wherein turning on or off said second primary switching device is controlled by said control circuit in the same way that turning on or off said primary switching device is controlled.

* * * * *

UNITED STATES PATENT AND TRADEMARK OFFICE
CERTIFICATE OF CORRECTION

PATENT NO. : 5,726,869
DATED : Mar. 10, 1998
INVENTOR(S) : YAMASHITA et al.

It is certified that error appears in the above-identified patent and that said Letters Patent is hereby corrected as shown below:

TITLE PAGE: [73] Assignees: Change "Fujtsu Denso" to --Fujitsu Denso--.

Col. 4, line 41, after "FIG. 15" insert --shows--.

Col. 5, line 33, change "vQ1" to --VQ1--.

Col. 11, line 21, change " +Lm," to -- +Lm*--;
line 45, change "Cos," to --Cos*--.

Col. 12, line 15, change "transformer m" to --transformer T,--.

Signed and Sealed this

Eighth Day of September, 1998

Attest:

BRUCE LEHMAN

Attesting Officer

Commissioner of Patents and Trademarks